United States Patent
Cabouillet et al.

(10) Patent No.: US 9,347,158 B2
(45) Date of Patent: May 24, 2016

(54) ELONGATE SELF-CLOSING SLEEVE FOR PROTECTING ELONGATE MEMBERS

(71) Applicants: DELFINGEN FR-ANTEUIL, Anteuil (FR); ASHEBORO ELASTICS CORP., Asheboro, NC (US)

(72) Inventors: Anne-Sophie Cabouillet, Besancon (FR); Matthew Paul Welshans, Denton, NC (US)

(73) Assignees: DELFINGEN FR-ANTEUIL, Anteuil (FR); ASHEBORO ELASTICS CORP., Asheboro, NC (US)

( * ) Notice: Subject to any disclaimer, the term of this patent is extended or adjusted under 35 U.S.C. 154(b) by 0 days.

(21) Appl. No.: 14/776,831

(22) PCT Filed: Mar. 13, 2014

(86) PCT No.: PCT/EP2014/055008
§ 371 (c)(1),
(2) Date: Sep. 15, 2015

(87) PCT Pub. No.: WO2014/140207
PCT Pub. Date: Sep. 18, 2014

(65) Prior Publication Data
US 2016/0024697 A1   Jan. 28, 2016

Related U.S. Application Data

(60) Provisional application No. 61/789,897, filed on Mar. 15, 2013.

(51) Int. Cl.
*D04B 21/16* (2006.01)
*D04B 21/20* (2006.01)
*H02G 3/04* (2006.01)

(52) U.S. Cl.
CPC .............. *D04B 21/205* (2013.01); *D04B 21/16* (2013.01); *H02G 3/0481* (2013.01)

(58) Field of Classification Search
CPC ..... D04B 21/16; D04B 21/205; D04B 21/202
USPC ................ 66/170, 171, 172 R, 192, 193, 195
See application file for complete search history.

(56) References Cited

U.S. PATENT DOCUMENTS

| | | | |
|---|---|---|---|
| 4,929,478 A | 5/1990 | Conaghan et al. | |
| 6,854,298 B2 * | 2/2005 | Relats | F16L 11/02 66/195 |
| 6,963,031 B2 * | 11/2005 | Gladfelter | F16L 3/26 174/74 A |
| 6,978,643 B2 * | 12/2005 | Akers | D04B 1/16 66/170 |
| 7,216,678 B2 * | 5/2007 | Baer | D03D 3/08 139/383 R |
| 7,395,680 B2 | 7/2008 | Baer et al. | |
| 7,690,225 B2 | 4/2010 | Relats et al. | |

(Continued)

*Primary Examiner* — Danny Worrell
(74) *Attorney, Agent, or Firm* — MH2 Technology Law Group, LLP

(57) ABSTRACT

The present invention concerns an elongate self-closing sleeve for protecting elongated members, said sleeve having internal and external opposite faces. Said sleeve comprises a warp knitted textile 1 having first 2 and second 3 longitudinal opposite free edges biased toward each other in order to define an internal space wherein said elongate members could be placed therein. Said warp knitted textile 1 comprises a first monofilament yarn 4 and a second monofilament yarn 5 both forming laying-in stitches extending in the same direction between said free edges on at least two wales 6 and a third yarn 12 forming chain stitches or tricot stitches, said first 4 and second 5 yarns being in plastic material(s).

14 Claims, 9 Drawing Sheets

(56) References Cited

U.S. PATENT DOCUMENTS

| | | | |
|---|---|---|---|
| 8,557,073 B2 | 10/2013 | Relats et al. | |
| 8,557,358 B1* | 10/2013 | Hennings | B29D 22/00 428/34.4 |
| 2005/0124249 A1 | 6/2005 | Uribarri | |
| 2010/0108171 A1* | 5/2010 | Relats Manent | F16L 57/04 138/125 |
| 2011/0209601 A1* | 9/2011 | Relats Casas | D04B 21/16 87/9 |
| 2012/0328810 A1* | 12/2012 | Relats Casas | F16L 57/06 428/36.1 |
| 2013/0220104 A1* | 8/2013 | Relats Casas | F16L 57/06 87/7 |
| 2015/0176162 A1* | 6/2015 | Relats Manent | D04B 21/205 66/195 |

\* cited by examiner

ELONGATE SELF-CLOSING SLEEVE FOR PROTECTING ELONGATE MEMBERS

CROSS-REFERENCE TO RELATED APPLICATIONS

This application is a U.S. National Stage application of International Appl. No. PCT/EP2014/055008 filed 13 Mar. 2014, which claims priority to U.S. Application No. 61/789,897 filed 15 Mar. 2013.

The present invention concerns the technical field of elongate self-closing sleeves for protecting elongate members, especially for protecting cables such as wiring harness, electrical cables and optical fibers, in the aeronautic, marine, railway and automotive industry.

BACKGROUND OF THE INVENTION

Protective sleeves that are longitudinally opened are known to be used for surrounding elongated members and protect them from cuts, abrasion, radiant heat, vibrations, induced wear and other harsh environmental threats. The vibrations can lead to wear of the elongate members and, consequently of the sleeve itself. Such protective sleeves are also known for routing elongate members.

Besides this, such protective sleeves are used to absorb the noise arising from vibrations between cables, especially in automotive industry.

Protective sleeves that are longitudinally opened make easier their placement around cables to be protected. These protective sleeves, even though are longitudinally opened, are elastic in their behaviour and return back to their tubular shape automatically when they are in the rest position. These longitudinally opened sleeves are also known as "wrap-around" sleeve.

When positioning within protective sleeve, the wiring or cables are also held together in a neat bundle, allowing a multiplicity of different items to be handled as sub-assembly, thus saving time and effort during integration of the items into their environment.

Protective sleeves may be made by weaving or knitting yarns into a weaved or knitted textile and then resiliently biasing the two longitudinal free edges of said textile toward each other in order to impart a tubular form to the textile and to define an internal space for receiving elongate members. Biasing may be effected by heating the yarns in the final shape that is sought after. For example, biasing may be effected by heating the yarns when the textile is wrapped around a cylindrical mandrel or is placed in tubular form inside a tube, wherein the yarns take on a permanent set confirming to the shape of the mandrel or to the shape of the internal volume of the tube. The textile is then cooled down still wrapped around said mandrel or still disposed inside the internal volume of said tube. This thermo-forming step may be performed only if the sleeve comprises a monofilament yarn in a plastic material. This thermo-forming step imparts a shape memory or elastic memory to the textile and therefore to the sleeve. The textile used during this thermo-forming step is in the form of a strip in order to form a sleeve that has a longitudinally axis and a transverse axis, the length of the strip being higher than its width. The sleeve is heated at a temperature that is generally close to the glass transition temperature or the softening point of said plastic material(s). One example of a thermo-forming step is described in U.S. Pat. No. 4,929,478, the description of which is incorporated herein by reference.

Monofilament yarns provide stiffness, and provide strong resilient biasing that maintains the textile in the tubular shape. The biased monofilaments also tend to restore the textile to its tubular shape in the absence of a distorting force, which is generally applied when the sleeve is manipulated to an open state to insert or remove an elongate member.

During this thermo-forming step, monofilament yarns in plastic material(s) shrink and form loops on the internal face or external face of the sleeve, especially when the textile is a warp-knitted textile and the monofilament yarns in plastic material(s) form laying-in stitches. These loops are unsightly and can be hooked by an elongate member during its insertion within the internal space of the sleeve when the loops are present on the internal face of the sleeve or can be hooked by other items disposed outside the sleeve when the loops are present on the external face of the sleeve. Moreover, these loops can wear the elongate members disposed within the internal space or items disposed outside the sleeve. These loops are even more developed when the sleeve comprises yarn(s) or is knitted on a substrate in a material that has a thermal behaviour that is different from the thermal behaviour of the plastic material(s) of the monofilaments yarns. The aforesaid loops could also be developed when the warp-knitted textile comprises multifilament yarns in glass or in an electrically conductive material or comprises yarns of different diameters or in different plastic materials.

DESCRIPTION OF THE INVENTION

The present invention has for object, according to a first aspect, an elongate self-closing sleeve for protecting elongated member that solves the here above cited drawbacks. Said sleeve comprises internal and external opposite faces and comprises a warp knitted textile having first and second longitudinal opposite free edges biased toward each other in order to define an internal space configured to receive said at least one elongate member.

Said warp knitted textile comprises a first monofilament yarn and a second monofilament yarn each forming laying-in stitches extending in the same direction between the first and second longitudinal free edges on at least two wales, each of said first and second yarns comprising at least one plastic material. The said warp knitting textile comprises also a third yarn forming chain stitches or tricot stitches.

Advantageously, with the use of two monofilaments yarns in plastic material(s) forming laying-in stitches extending in the same direction in a repeated manner between the two longitudinal free edges of the sleeve along the longitudinal axis of the sleeve, the knitting pattern of the warp knitted textile is well-balanced and provides enough biasing force to monofilaments structure to form a self-closing sleeve with a good closure.

Therefore, the formation of loops during the thermo-forming step described here above is limited or suppressed, even when the warp knitted textile comprises for example covering yarn(s) that has/have a thermal behaviour different from the one of the first and second yarns.

The technical features describing the protective sleeve in the "background of the invention" part may apply to the self-closing sleeve according to the invention, particularly concerning the thermo-forming step.

According to the invention, the internal face of the self-closing sleeve faces the internal space of said sleeve for receiving elongate members whereas the external face of the self-closing sleeve faces the outside of said sleeve.

We understand, according to the invention, by the fact that the first yarn and the second yarn form laying-in stitches extending in the same direction that the laying-in stitches formed by the first and second yarns are not in opposition. The laying-in stitches formed by said first and second yarns are consecutives in the weft direction between first and second opposite free edges.

The warp knitted textile according to the invention comprises wales of stitches designated in the present as "wales" and courses of stitches designated in the present text as "courses". The wales of stitches and the courses of stitches correspond respectively to the warp direction (C) and to the weft direction (T) of the warp knitted textile.

The transverse axis (t) of the sleeve is perpendicular to the longitudinal axis (L) of the sleeve. The transverse axis (t) of the sleeve corresponds to the weft direction (T) of the warp-knitted textile and the longitudinal axis (L) of the sleeve corresponds to the warp direction (C) of the warp-knitted textile.

The warp knitted textile according to the invention is in the form of a strip before the thermo-forming step that imparts to the sleeve its self-closing shape. The length of the strip is higher than its width.

The first yarn, and optionally the second yarn, may form laying-in stitches that extend in a repeated manner in the weft direction (T) between said two longitudinal free edges along all the width of the strip.

The chain stitches or tricot stitches form loops which can be closed or opened. The chain stitches form loops that extend on one wale (or one needle) whereas the tricot stitches form loops that extend on at least two wales (or at least two needles).

According to the invention, the internal face and the external face of the warp knitted textile strip correspond respectively to the internal face and the external face of the self-closing sleeve.

The warp-knitted textile may be knitted on a Rachel knitting machine or a crochet-type knitting machine.

The two longitudinal free edges of the warp-knitted textile overlap each other or are in contact defining a circular cross-section for the sleeve.

According to the invention, by the term "laying-in stitches on at least two wales", we understand that the laying-in stitches are formed on at least two needles.

Preferably, the first yarn and the second yarn form laying-in stitches on at most ten needles, more preferably on at most eight needles, particularly on at most six needles, and more particularly on at most four needles.

The third yarn forms chain stitches or tricot stitches that extend in the warp direction along the longitudinal axis of the sleeve.

The third yarn provides dimensional stability to the warp knitted textile in the warp direction.

The first yarn and/or the second yarn and/or the third yarn can be in the same plastic material or in different plastic materials, more particularly in a plastic material chosen among the following polymers, alone or combined: polyamide 6-6, polyamide 4-6, polyamide 6, polyamide 12, polyethylene terephthalate, polypropylene, polyetherketone (PEK), polyetheretherketone (PEEK), polyphenylene sulphide (PPS), polyethylene, polyvinyl chloride (PVC), polyurethane, polyvinylidene fluoride (PVDF), ethylene tetrafluoroethylene (ETFE), fluoropolymers such as NEOFLON EFEP sold by Daikin or HYFLON PFA or MFA sold by Solvay, poly(tetrafluoroethylene) (PTFE); polyoxymethylene (POM), polybutylene terephtalate (PBT), poly (p-phenylene benzobisoxazole) (PBO).

The third yarn could also be in a material selected in the following list, optionally in combination with a plastic material here above described: meta-aramid, para-aramid, or in cotton.

The third yarn may be chosen in the list that consists of: a monofilament yarn, a multifilament yarn and a staple fiber yarn.

The third yarn could be a multifilament yarn in glass or silica or could be an electrically conductive yarn that may be a monofilament or a multifilament yarn in a material selected alone or in combination among: stainless steel such as AISI 316 or 316L or 304, aluminium, copper, nickel plated copper, tinned copper.

In one embodiment, the first yarn and the second yarn are also knitted on at least three courses on a same wale and are alternated with each other on said same wale.

The first yarn and the second yarn are knitted on an uneven number of courses on a same wale.

Advantageously, the first yarn and the second yarn impart stability to the warp-knitted textile along the longitudinal axis of the sleeve. The first and second monofilament yarns are blocked in an alternative way on a same wale by the stitches of the third yarn along the warp direction. Therefore, after the thermo-forming step has been done, no loop is formed since no portion of the first and second monofilaments protrudes from the internal face or the external face of the sleeve. The first and second yarns are held in the warp direction by the stitches of the third yarn.

Preferably, the first yarn and the second yarn are knitted on at most nine courses on a same wale, more preferably on at most seven courses on a same wale, particularly on at most five courses on a same wale, and more particularly on three courses on a same wale.

In one embodiment, the first yarn, and optionally the second yarn, overlap(s) at least two courses in the weft direction between two neighbouring wales when said first, and optionally second, yarn(s) extend(s) on at least two wales.

According to the invention, we understand by "two wales are neighbours" that said two wales are disposed side by side (or are adjacent) in the weft direction of the warp knitted textile.

Advantageously, the first yarn, and optionally the second yarn, extend(s) diagonally between two neighbouring wales, particularly in a direction (M) that forms an angle α with the transverse axis (t) of the sleeve. More particularly, the angle α is higher than or equal to 20°, and preferably less than or equal to 90°, more preferably less than or equal to 70°.

This feature helps to reduce the tendency of the sleeve to form loops after the thermo-forming step.

When a yarn forms laying-in stitches on at least two wales and extends between two neighbouring wales in overlapping only one course, the angle α is close to 0°.

In one embodiment, the warp knitted textile comprises at least a fourth monofilament yarn, and optionally a fifth monofilament yarn, that form(s) laying-in stitches in opposition to the laying-in stitches formed by each of the first yarn and second yarn.

The fourth yarn, and optionally the fifth yarn, improve(s) the resiliency and the biasing force of the self-closing sleeve and therefore improve(s) the closure ability of the sleeve.

The fourth yarn, and optionally the fifth yarn, may form laying-in stitches that extend in a repeated manner in the weft direction (T) between said two longitudinal free edges, particularly along all the width of the strip. The aforesaid embodiment is preferred when stiffness is sought after for the sleeve, especially when the sleeve comprises yarn(s) that could not be thermoformed.

The fourth yarn, and optionally the fifth yarn, may also form laying-in stitches that extend in the weft direction (T) in a repeated manner in one or several determined zones that is/are disposed between the two longitudinal free edges of the sleeve.

The fourth yarn and/or the fifth yarn may be in the same plastic material or in different plastic materials, more particularly in a plastic material chosen among the following polymers, alone or combined: polyamide 6-6, polyamide 4-6, polyamide 6, polyamide 12, polyethylene terephthalate, polypropylene, polyetherketone (PEK), polyetheretherketone (PEEK), polyphenylene sulphide (PPS), polyethylene, polyvinyl chloride (PVC), polyurethane, polyvinylidene fluoride (PVDF), ethylene tetrafluoroethylene (ETFE), fluoropolymers such as NEOFLON EFEP sold by Daikin or HYFLON PFA or MFA sold by Solvay, poly(tetrafluoroethylene) (PTFE); polyoxymethylene (POM), polybutylene terephthalate (PBT), poly(p-phenylene benzobisoxazole) (PBO).

In one embodiment, the fourth monofilament yarn, and optionally the fifth monofilament yarn, form(s) laying-in stitches in a first zone and in a second zone, the first zone is in proximity to said first longitudinal free edge and the second zone is in proximity to said second longitudinal free edge.

Preferably, the fourth yarn, and optionally the fifth yarn, is/are present only in these two zones to impart stiffness to the two longitudinal free edges of the sleeve and thus helping said free edges to be in contact or to overlap each other in order to perfectly close the internal space of the sleeve.

In one embodiment, the fourth yarn, and optionally the fifth yarn, is/are also knitted on at least three courses on a same wale.

In one sub-embodiment, the fourth yarn and the fifth yarn are alternated with each other on a same wale.

The first yarn, and optionally the fifth yarn, is/are knitted on an uneven number of courses on a same wale.

The technical effects described here above concerning the first and the second yarns also apply in this embodiment.

Preferably, the fourth yarn, and optionally the fifth yarn, is/are knitted on at most nine courses on a same wale, more preferably on at most seven courses on a same wale, more particularly on at most five courses on a same wale and more particularly on three courses on a same wale.

In one embodiment, the fourth yarn, and optionally the fifth yarn, overlap(s) at least two courses in the weft direction between two neighbouring wales when said fourth, and optionally fifth yarn(s) extend(s) on at least two wales.

Advantageously, the fourth yarn, and optionally the fifth yarn, extend(s) diagonally between two neighbouring wales, more particularly in a direction (P) that forms an angle α" with the transverse axis (t) of the sleeve. Even more particularly, the angle α" is higher than or equal to 20°, and preferably less than or equal to 90°, more preferably less than or equal to 70°.

This feature helps to reduce the tendency of the sleeve to form loops after the thermo-forming step.

In one embodiment, the warp knitted textile comprises at least one covering yarn forming one or several laying-in stitche(s) extending between said first and second longitudinal opposite free edges on the external face or the internal face of said sleeve.

Advantageously, one or several covering yarn(s) form(s) a cover on the internal face or the external face of the sleeve. Depending from the composition of the covering yarn(s), the cover may have one or several functions.

These functions could be chosen alone or in combination among the following functions: mechanical resistance, abrasion resistance, cut resistance, reflectivity, heat insulation, electromagnetic function, sound dampening and electrical function.

For example, when the warp-knitted textile comprises one or several multifilament yarn(s) in glass or silica, the sleeve comprises a cover on its internal or external face, preferably on its external face, that imparts heat insulation to the self-closing sleeve.

A covering yarn may form laying-in stitches extending in the weft direction. Said covering yarn(s) may form laying-in stitches extending on at least three needles, preferably on at least five needles, more preferably on at least eight needles, even more preferably on at least ten needles, particularly on at most 25 needles, more particularly on at most 15 needles.

In one embodiment, the at least one covering yarn is chosen among: a multifilament yarn comprising at least one plastic material, an electrically conductive yarn or a multifilament yarn in glass or silica.

In one embodiment, one or several covering yarn(s) may be in the same plastic material or in different plastic materials, more particularly in a plastic material chosen among the following polymers, alone or combined: polyamide 6-6, polyamide 4-6, polyamide 6, polyamide 12, polyethylene terephthalate, polypropylene, polyetherketone (PEK), polyetheretherketone (PEEK), polyphenylene sulphide (PPS), polyethylene, polyvinyl chloride (PVC), polyurethane, polyvinylidene fluoride (PVDF), ethylene tetrafluoroethylene (ETFE), fluoropolymers such as NEOFLON EFEP sold by Daikin or HYFLON PFA or MFA sold by Solvay, poly(tetrafluoroethylene) (PTFE); polyoxymethylene (POM), polybutylene terephtalate (PBT), poly(p-phenylene benzobisoxazole) (PBO).

One or several covering yarn(s) may also be in a material selected in the following list, optionally in combination with a plastic material here above described: meta-aramid, para-aramid, or in cotton.

One or several covering yarn(s) may be chosen in the list that consists of: a monofilament yarn, a multifilament yarn and a staple fiber yarn.

The electrically conductive yarn may be a monofilament or a multifilament yarn in a material selected alone or in combination among: stainless steel, such as AISI 316 or 316L or 304, aluminium, copper, nickel plated copper, tinned copper.

The electrically conductive yarn(s) impart(s) electromagnetic protection to the sleeve. This function is particularly sought after when the elongate members are cables through which an electrical current passes.

In one embodiment, a covering yarn forms one laying-in stitch extending between said two longitudinal opposite free edges.

Said covering yarn extends between the first wale and the last wale in the weft direction, preferably in overlapping only one course between two neighbouring wales in order to obtain a more regular and important covering.

In one embodiment, one or several covering yarn(s) form(s) laying-in stitches that overlap(s) only one course in the weft direction between two neighbouring wales when said yarn(s) extend(s) on at least two wales.

Therefore, the covering yarn(s) extend(s) in a parallel to the transverse axis (t).

In one embodiment, the third yarn is a multifilament yarn, having a fineness which is higher than or equal to 70 deniers and less than or equal to 1200 deniers.

In one embodiment, the first and/or the second and/or the fourth and/or the fifth monofilament(s) yarn(s) has/have a diameter that is higher than or equal to 0.10 mm and less than or equal to 0.50 mm, preferably higher than or equal to 0.20 mm and less than or equal to 0.40 mm.

In one embodiment, the sleeve comprises an electromagnetic film or coating on its external face.

Electromagnetic protection is sought when an electrical current passes through the elongate members.

In one embodiment, the sleeve comprises a reflective foil or a reflective coating on its external face, for example a foil in aluminium.

Preferably, the reflective foil is a metallized foil, especially a foil in a plastic material according to the invention such as poly(ethylene terephtalate), covered by a thin film in aluminium.

This reflective foil or coating reflects the heat (especially infra-red rays) and protect from heat the elongate members disposed within the internal space of the sleeve.

This reflective foil may comprise one face covered by an adhesive in order to be stick on the external face of the sleeve, for example in its self-closing configuration, therefore after the thermo-forming step.

According to the invention, the reflective or electromagnetic coating comprises at least one polymer, said polymer may be chosen from PVC (polyvinyl chloride), PET (polyethylene terephtalate), PU (polyurethane), PA (polyamide(s)) or any other material known in the art that complies with end uses of the sleeve, and at least one filler, said filler is selected to impart electromagnetic and/or reflective properties.

A coating or a foil may be both electromagnetic and reflective.

Preferably said filler is selected among: stainless steel such as AISI 316 or 316L or 304, aluminium, copper, nickel plated copper, tinned copper, titanium dioxide, preferably these elements are in powder form.

In one embodiment, the sleeve comprises at least one thermofusible polymer disposed in a regular pattern on its internal face and/or its external face.

The thermofusible polymer is disposed in a regular pattern, for example in dots form, lines form (along the transverse axis (t) and/or the horizontal axis (L)) or other determined pattern.

When the sleeve comprises multifilament yarn(s) comprising at least one plastic material, as defined in the present invention, that can be melted when said yarns are cut with a hot knife cutting device or a hot blade device, the cut ends are melted therefore no fraying occurs.

Said multifilament yarn(s) may be the third yarn or one or several covering yarn(s) according to the invention.

Warp knitted textile according to the invention comprising multifilament yarn(s) plastic material may also be cut with a laser cutting device or a ultrasonic cutting device.

Nevertheless, when the sleeve comprises one or several multifilament yarn(s) that cannot be melted at a temperature that is less than 250° C., particularly when no hot knife cutting device could be used, the cut ends have a tendency to fray. In that case, if no thermal cutting is possible, the sleeve is cut with a cold cutting device, for example with a guillotine device.

The thermofusible polymer disposed on the internal face and/or the external face holds together the filaments of the cut multifilament yarn(s) at regular interval, thus avoiding the fraying of the cut ends.

For example, the thermofusible polymer may be brought by a thermofusible yarn knitted in the warp knitted textile in forming laying-in stitches or tricot stitches or chain stitches. This thermofusible yarn may be knitted with the first and/or the second and/or the third and/or the fourth and/or the fifth yarn and/or with one or several covering yarn(s) according to the invention. Therefore, the thermofusible polymer is on the external face and/or the internal face of the sleeve according to its knitting pattern.

Preferably, the thermofusible polymer is selected among: polyamide 6, polyamide 12, polyamide 6-10, polyamide 6-12, polyamide 6-6, a copolyamide of the aforesaid polyamide polymers, copolyester, low density polypropylene and low density polyethylene.

The present invention concerns, according to a second aspect, a method for producing a self-closing sleeve, for protecting elongate members, comprising the following steps:

A first step of warp knitting a textile having first and second longitudinal opposite free edges with a first monofilament yarn, a second monofilament yarn and a third yarn, each of said first and second yarns forming laying-in stitches extending in the same direction between said first and second free edges on at least two wales, each of said first and second yarns comprising at least one plastic material, said third yarn forming chain stitches or tricot stitches, and said warp knitting step comprises also the knitting of at least one thermofusible yarn, A second step of heat treating the warp knitted textile obtained from said first step to melt at least in part said thermofusible yarn.

The thermofusible yarn(s) may be a single component yarn or a multicomponent yarn. The single component yarn may be for example a low melt yarn. The multicomponent yarn may be for example a bicomponent yarn, like a yarn of core-sheat type, side by side type, tipped type (having for example a transversal section in cross form or trilobal form). The core-sheat yarn may comprise a core and a sheat that are concentric and represent 50/50 in volume, or 20/80 in volume or are eccentric or in trilobal form. For example, the thermofusible polymer is the sheat of a core-sheat yarn.

The warp knitted textile obtained from the first step is heated at a determined temperature and during a determined time in order to melt the thermofusible polymer of the thermofusible yarn.

This heat treatment may be done during the thermo-forming step or may be done before the thermo-forming step, particularly if the sleeve comprises covering yarn(s) and/or a reflective coating or film that would slow the diffusion of the heat into the warp knitted textile.

The definitions given here above concerning the thermofusible yarn and the thermofusible polymer apply to the method according to the invention. The thermofusible yarn comprises at least one thermofusible polymer.

Preferably, when the sleeve comprises at least one multifilament yarn that cannot be cut with a hot knife cutting device or has a melting temperature higher than 250° C., the thermofusible polymer(s) of the melted thermofusible yarn hold(s) together the filaments of the multifilament yarn. The thermofusible polymer(s) is/are on the external face and/or the internal face of the warp knitted textile in a regular pattern corresponding to the knitting pattern(s) of the thermofusible yarn(s).

In one embodiment, at least one thermofusible yarn is knitted with the third yarn in the warp knitted textile.

The thermofusible yarn forms dots of thermofusible polymer in the warp direction along the tricot stitches or chain stitches, at regular interval in the weft direction.

In on embodiment, at least one thermofusible yarn is knitted with one covering yarn that forms one or several laying-in stitche(s).

In one embodiment, the first step comprises the knitting of at least one covering yarn that is a multifilament yarn in glass or silica.

In another embodiment, the first yarn and/or the second yarn and/or the third yarn and/or the fourth yarn and/or the fifth yarn could be disposed on the internal face and/or the external face of the self-closing sleeve. Preferably, the first yarn and/or the second yarn and/or the fourth yarn and/or the fifth yarn is/are disposed on the internal face of the self-closing sleeve that faces its internal space whereas the third yarn is disposed on the external face of the self-closing sleeve that faces the outside of said sleeve.

DETAILED DESCRIPTION OF THE EXEMPLARY EMBODIMENTS

Figure 1:
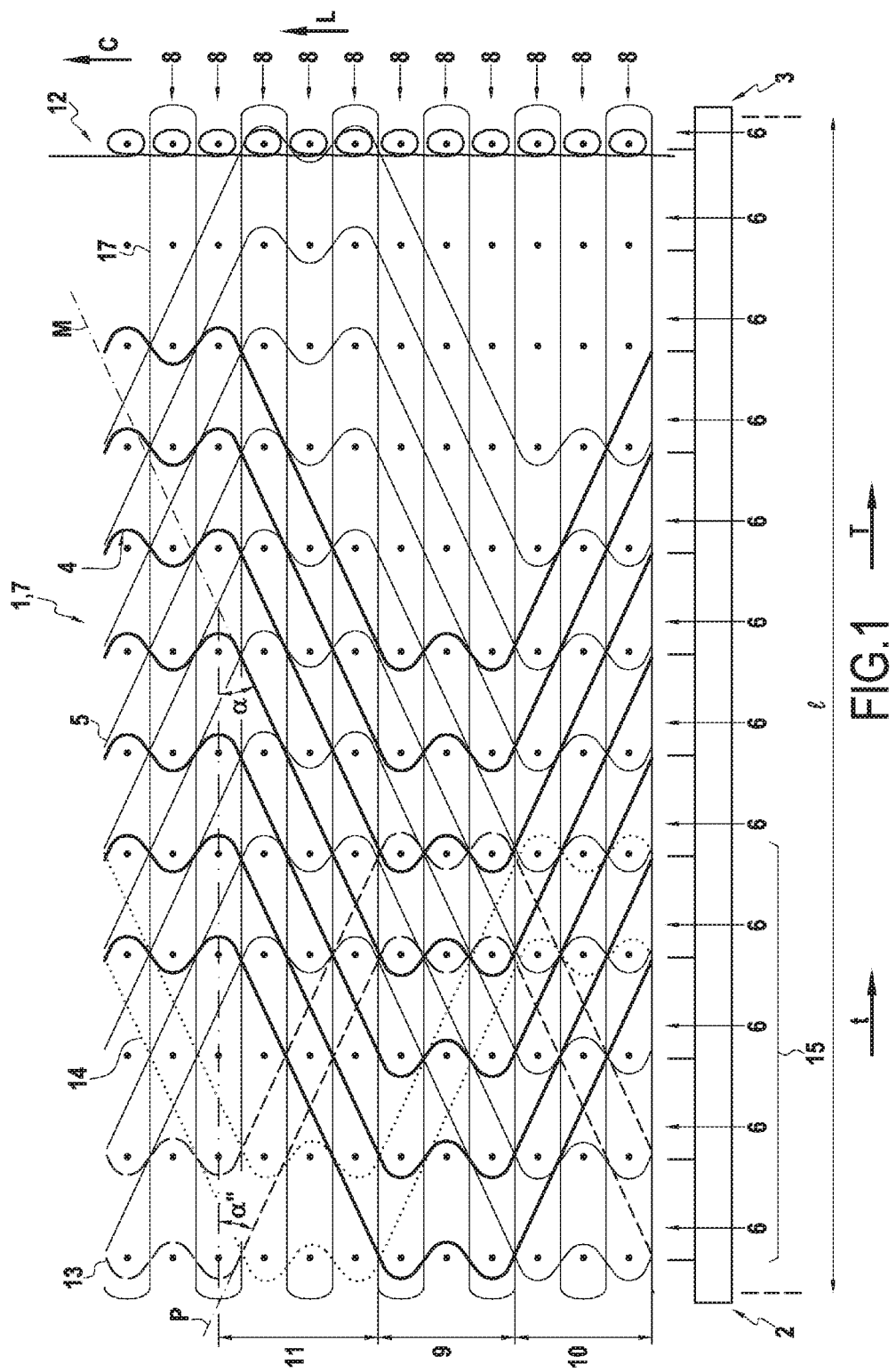
FIG. 1 represents an example of a knitting pattern of a warp knitted textile according to the invention.

FIG. 1 shows a knitting pattern of a warp knitted textile 1 in strip form 7 having first 2 and second 3 longitudinal opposite free edges, said warp knitted textile comprises a first monofilament yarn 4 and a second monofilament yarn 5 each forming laying-in stitches extending in the same direction between said free edges 2, 3 on at least two wales 6, each of said first 4 and second 5 yarns comprises at least one plastic material. In this example, the first 4 and second 5 monofilaments extend on four wales 6 (or four needles) and form laying-in stitches that are consecutive and not in opposition. The warp knitted textile 1 has a warp direction (C) corresponding to the longitudinal (L) axis of the self-closing sleeve 18 and a weft direction (T) corresponding to the transverse axis (t) of said sleeve 18. The warp-knitted textile 1 in strip form 7 is represented in a planar configuration in FIGS. 1, 2A and 2B.

The first 4 and second 5 monofilaments form laying-in stitches on a repeated manner between the first 2 and second 3 longitudinal opposite free edges on all the width (I) of the warp knitted textile 1 in strip form 7.

In this particular example, the first yarn 4 and the second yarn 5 are knitted on at least three courses 8 on a same wale 6 and are alternated with each other on this said wale 6 such as on intervals 9 and 10. More particularly, the first yarn 4 and the second yarn 5 are knitted on uneven number of courses 8, particularly three courses 8, on a same wale 6.

The first yarn 4 and the second yarn 5 overlap at least two courses 8 in the weft direction (T) between two neighbouring wales 6 when said yarns 4, 5 extend on at least two wales 6. For example, the first yarn 4 and the second yarn overlap two courses 8 in the weft direction (T) between two neighbouring wales 6 when said yarns 4, 5 extend on four wales, such as on interval 11.

Thanks to this feature, the first yarn 4 and the second yarn 5 extend diagonally between two neighbouring wales 6 in a direction (M) that forms an angle $\alpha$ with the transverse axis (t) of the sleeve 7. Said angle $\alpha$ is higher or equal to 20°.

The warp knitted textile comprises also a third yarn 12 that forms chain stitches or tricot stitches extending in a warp direction (C), particularly forming closed chain stitches on FIG. 1. Only one wale of chain stitches has been represented on FIG. 1 for the sake of clarity but the warp knitted textile 1 comprises several wales of closed chain stitches formed by the third yarn 12, on all the width (I) of the strip 7. The third yarn 12 may be a multifilament yarn having a fineness which is comprised between 70 deniers and 1200 deniers. The third yarn 12 may be in a plastic material, such as polyethylene terephthalate or PEEK or PPS.

Moreover, the warp knitted textile 1 comprises a fourth monofilament yarn 13 and a fifth monofilament yarn 14, each forming laying-in stitches in opposition to the laying-in stitches formed by the first 4 and second 5 yarns, in a first zone 15 and in a second zone 16. The first zone 15 is in proximity to the first longitudinal free edge 2 and the second zone 16 is in proximity to the second longitudinal free edge 3.

The fourth 13 yarn and the fifth 14 yarn are also knitted on at least three courses 8, in this example on three courses 8, on a same wale 6 and are alternated with each other on said same wale 8. In one embodiment that is not represented in figures, the fourth 13 and second 14 yarns may also extend in a repeated manner on all the width (I) of the strip 7.

The fourth yarn 13 and the fifth yarn 14 overlap at least two courses 8 in the weft direction (T) between two neighbouring wales 6 when said yarns 13, 14 extend on at least two wales 6.

Therefore, the fourth yarn 13 and the fifth yarn 14 extend diagonally between two neighbouring wales 6 in a direction (P) that forms an angle $\alpha''$ with the transverse axis (t) of the sleeve 7. The angle $\alpha''$ that is higher or equal to 20°.

For the sake of clarity, the knitting pattern is partially represented on FIG. 1: the fourth 13 and the fifth 14 yarns are not represented in the second zone 16, and the first 4 and second 5 yarns are not represented in a repeated manner on all the width (I) of the strip 7.

Figure 2A:
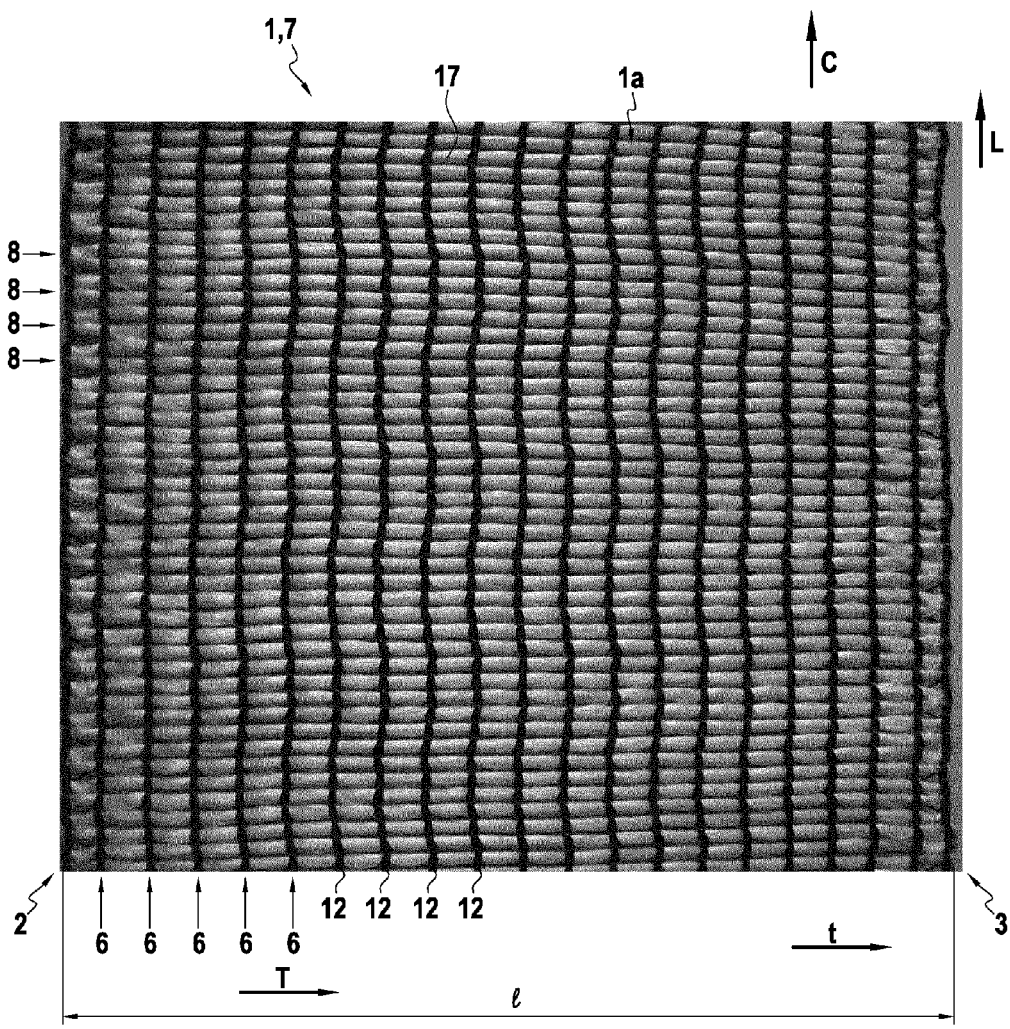
FIG. 2A is a top view of the external face of the warp-knitted textile of the FIG. 1 in strip form before the thermo-forming step.
Figure 2B:
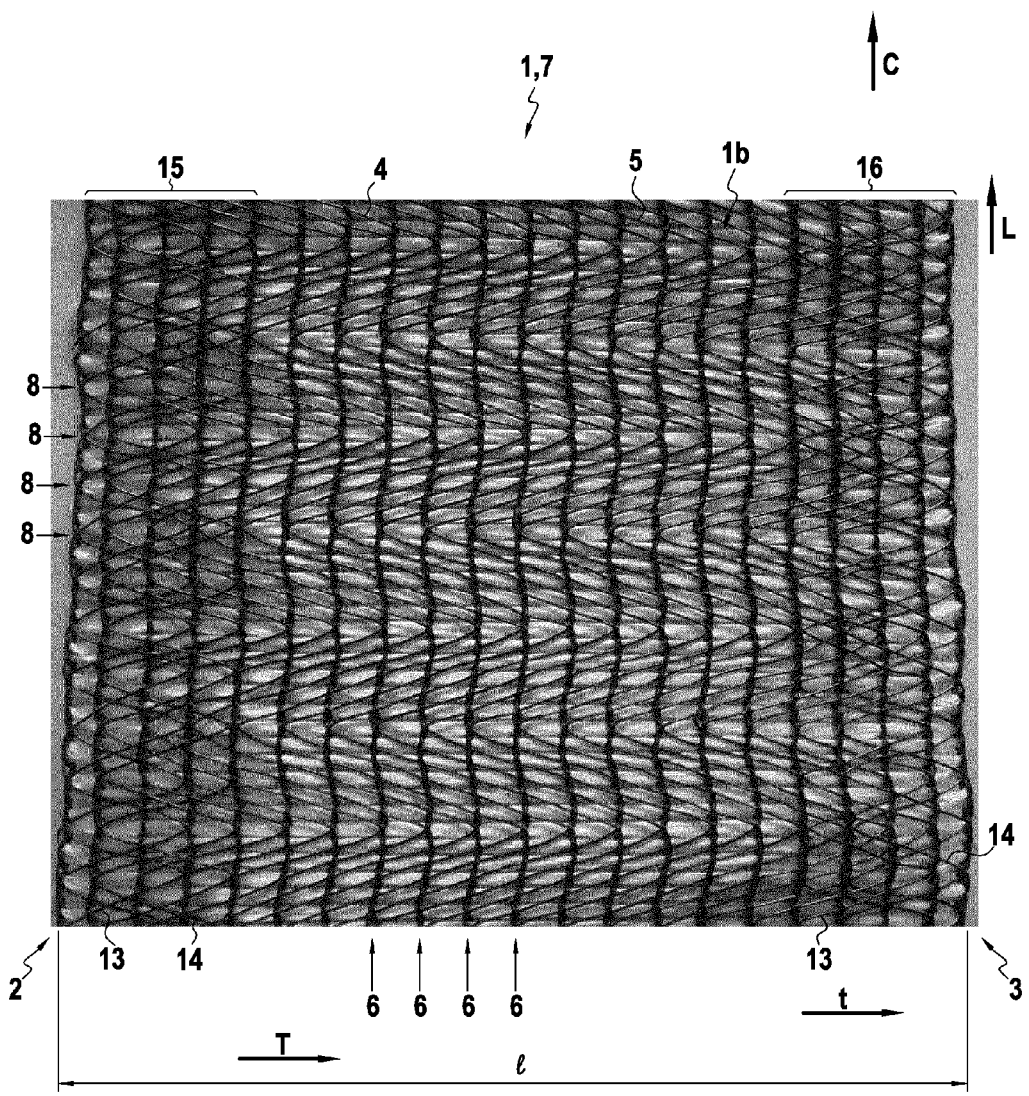
FIG. 2B is a top view of the internal face of the warp knitted textile of the FIG. 1 in strip form before the thermo-forming step.

As represented on FIGS. 2A and 2B, the warp knitted textile 1 comprises one covering yarn 17 forming one laying-in stitch extending on the external face 1a of the warp knitted textile 1 between its longitudinal free edges 2,3. The external face 1a comprises also the third yarns 12 forming chain stitches. In this example, the covering yarn 17 is in glass and imparts heat insulation properties. This covering yarn 17 is for example a multifilament yarn. The covering yarn 17 overlaps only one course 8 in the weft direction (T) between two neighbouring wales (6) when extending on all the wales (6) between the first 2 and second 3 longitudinal free edges. Therefore, the covering yarn 17 does not extend in diagonal but extends in a parallel to the transverse axis (t) between the two longitudinal free edges 2,3. The internal face 1b of the warp knitted textile 1 is covered by the first 4, the second 5, the fourth 13 and the fifth 15 yarns that form laying-in stitches.

In FIGS. 1, 2A en 2B, the covering yarn 17 forms only one laying-in stitch extending on twenty one wales or needles between said longitudinal opposite free edges 2,3. But it is also possible that the warp knitted textile 1 comprises several covering yarns that form laying-in stitches on a number of wales that is comprised between three to ten wales. Said laying-in stitches extend on all the width (I) of the warp knitted textile 1 in strip form 7 in a repeated manner between the longitudinal edges 2,3 of the warp knitted textile 1 in order to cover the external face 1a or the internal face 1b of the warp knitted textile 1 and impart a function depending from the composition of the covering yarns.

The first 4, second 5, fourth 13 and fifth 14 monofilament yarns have a diameter that is comprised between 0.10 mm and 0.50 mm, preferably between 0.20 mm and 0.50 mm, more preferably between 0.20 mm and 0.40 mm.

Preferably, the first 4, the second 5, the fourth 13 and the fifth 14 monofilament yarns are in PET, PPS, PEEK or polyamide(s).

The covering yarn 17 is disposed through the loops of the closed chain stitches of the third yarn 12.

As it can be seen on FIG. 2B, the first 4 and second 5 monofilament yarns extend on all the width (I) of the warp knitted textile (1).

The fourth 13 and fifth 14 monofilament yarns extend only in the first 15 and second 16 zones that are disposed in proximity respectively to the first 2 and second 3 free edges of said textile 1. But in another embodiment, the fourth 13 and the fifth 14 monofilaments yarns extend also on all the width (I) of the warp knitted textile 1 in a repeated manner.

The warp knitted textile 1 comprises at least one thermofusible yarn (not represented) which is knitted with the third yarn 12 and therefore forms chain stitches.

The warp knitted textile 1 may be knitted on a crochet knitting machine with five weft guide bars for weft insertion, a guide bar per yarn that forms laying-in stitche(s).

The thermofusible yarn is for example the sheat of a yarn of core-sheat type or is a low melt yarn, for example in polyamide(s).

The warp knitted textile 1 is then submitted to an heat treatment in order to melt the thermofusible polymer of the thermofusible yarn, for example at a temperature which is comprised between 80° C. and 220° C., during a time that is comprised between one minute to ten minutes.

After this heat treatment, the warp knitted textile strip 1 is placed in a wrapped configuration into a tube in position wherein the first 2 and second 3 longitudinal free edges are in contact or overlap each other, and is submitted to a temperature that is comprised between 80° C. to 200° C., for example between 120° C. and 180° C., during a time that is comprised between five minutes and twenty minutes. The warp knitted textile 1, still in said wrapped configuration, is then cooled, during for example five minutes to thirty minutes. After this thermo-forming step, the warp knitted textile 1 is extracted from the tube and has a tubular shape corresponding to the shape of the self-closing sleeve 18 represented in FIG. 3.

The heat treatment step and the thermo-forming step are done separately.

Figure 3:
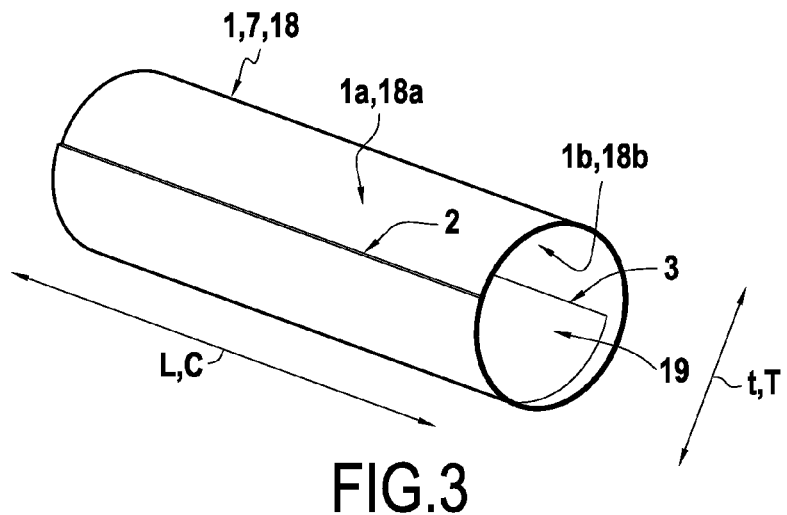
FIG. 3 is a schematic perspective view of a first example of an elongate self-closing sleeve according to the invention comprising the warp knitted textile represented in FIGS. 1, 2A and 2B, that has been thermoformed.

FIG. 3 represents the elongate self-closing sleeve 18 obtained after the thermo-forming step. The internal face 1b and the external face 1a of the warp knitted textile 1 in strip form 7 correspond respectively to the internal face 18b and the external face 18a of the self-closing sleeve 18. The first 2 and second 3 longitudinal free edges overlap each other and define an internal space 19 configured to receive at least an elongate member, such as a cable.

Figure 4:
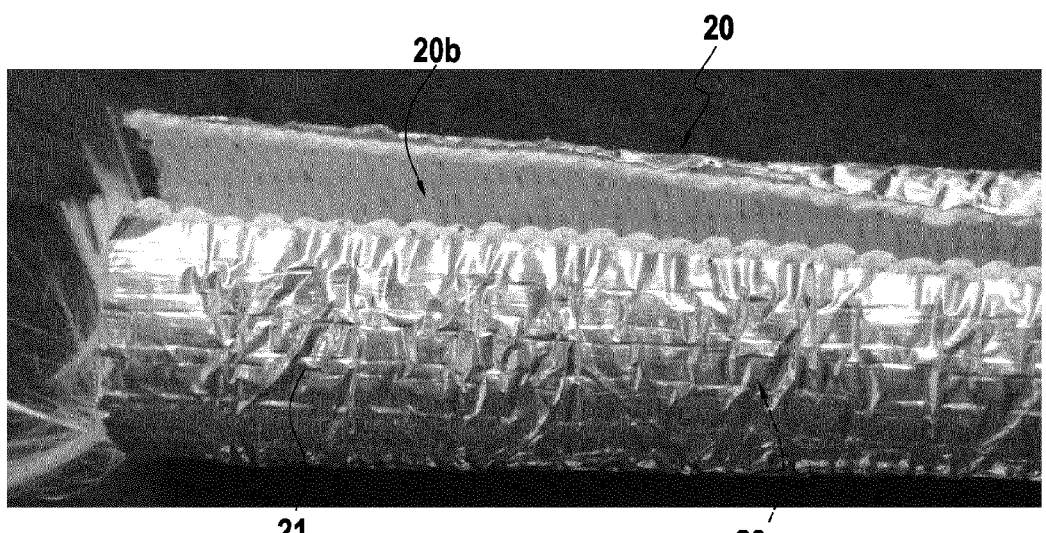
FIG. 4 is a schematic perspective view of an embodiment of the first example of elongate self-closing sleeve represented in FIG. 3 comprising a reflective foil.

The self-closing sleeve 20 represented in FIG. 4 is one embodiment of the self-closing sleeve 18 represented in FIG. 3. The self-closing sleeve 20 comprises a reflective foil 21 disposed on its external face 20a. This reflective foil 21 may comprise an adhesive on its internal face in order to be sticked to the external face 20a of the self-closing sleeve 20. The reflective foil 21 is sticked to the external face 20a of the sleeve 20 after the thermo-forming step in order to not act as a thermal barrier during said step. The internal face 21b of the self-closing sleeve 20 opens out on its internal space.

Figure 5:
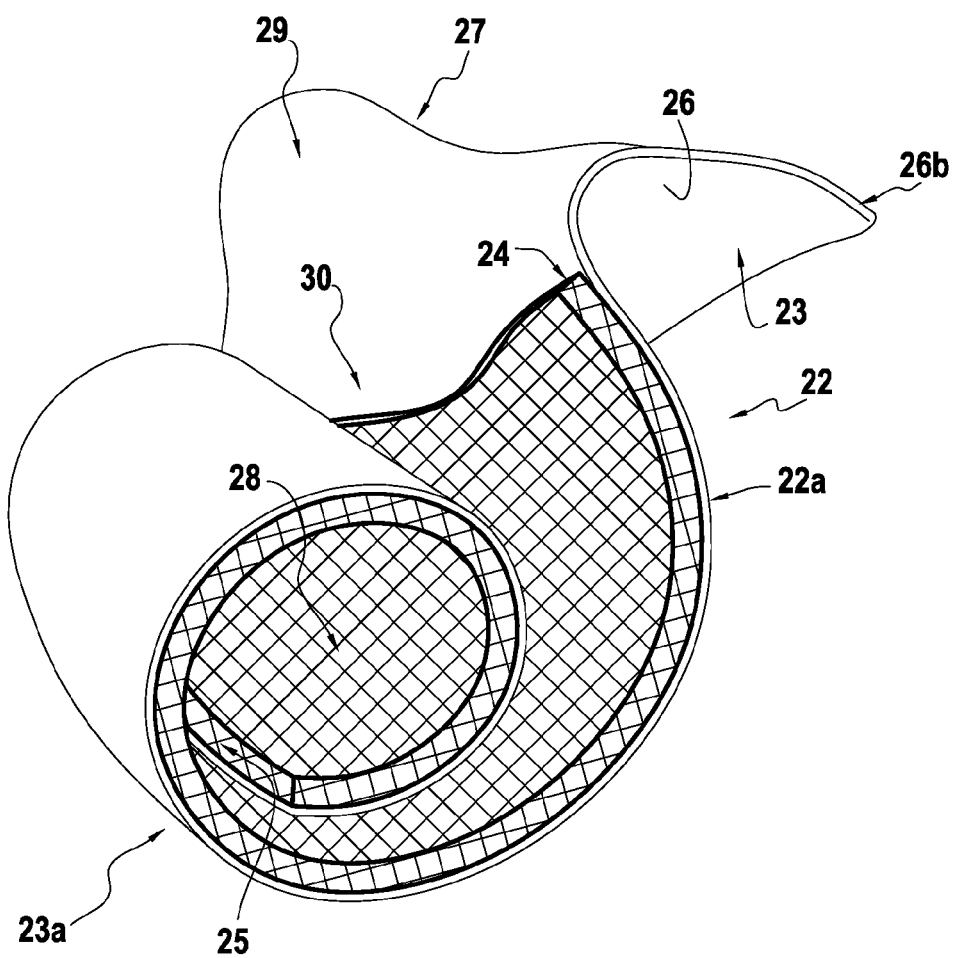
FIG. 5 is a schematic perspective view of another embodiment of the first example of elongate self-closing sleeve represented in FIG. 3.

The self-closing sleeve 22 represented in FIG. 5 is one embodiment of the self-closing sleeve 20 represented in FIG. 4. The self-closing sleeve 22 comprises a reflective foil 23 disposed on its external face 22a that projects from one of the two first 24 and second 25 longitudinal opposite free edges to form a longitudinal portion 26 in said reflective foil 23. The internal face 26b of said longitudinal portion 26 is covered by a laminated paper 27, for example a paper covered with silicone. This laminated paper comprises a longitudinal tab 29. In use, the at least one elongate member to protect is placed within the internal space 28, the laminated paper 27 is then removed thanks to the tab 29, and the internal face 26b of the longitudinal portion 26 is sticked to the external face 23a of the reflective foil 23 in order to perfectly close the longitudinal opening or access slit 30 of said sleeve 22.

Thermal effectiveness of the self-closing sleeve 22 has been measured according to SAE J2302 standard's specifications dated February 2011. The samples length is about 300 mm and the distance between the tested part and the heat resistor is 25 mm. Every 30 seconds, a temperature's measurement is carried out, during 30 minutes at different temperatures instructions specified in the request. The test is made in two steps: a reference measure is first taken with only the ceramic tube, and then the test is repeated with the self-closing sleeve 22 on the ceramic tube.

The first thermocouple measures the temperature on the surface of the ceramic tube during reference testing and inside the self-closing sleeve during the sample test. The second thermocouple measures the ambient temperature in the box.

The results are the differences (delta T° C.) between the temperatures measured on the surface of the ceramic tube and the temperatures measures inside the self-closing sleeve (said self-closing sleeve being wrapped around the ceramic tube) for specific ranges of ambient temperature in the box.

After 180 seconds, at 120° C., 260° C., 482° C. and 538° C. for the ambient temperature, delta T° C. is respectively 7° C., 16° C., 65° C. and 94° C.

After 1080 seconds, at 120° C., 260° C., 482° C. and 538° C. for the ambient temperature, delta T° C. is respectively 9° C., 27° C., 83° C. and 127° C.

After 1800 seconds, at 120° C., 260° C., 482° C. and 538° C. for the ambient temperature, delta T° C. is respectively 7° C., 25° C., 87° C. and 129° C.

According to another aspect, the warp knitted textile according to the invention and here above described may also be knitted on a sound dampening textile substrate.

Therefore, the present invention concerns, according to a third aspect, an improved textile with sound dampening quality.

RELATED ART

When considering acoustical dampening materials and protective coverings, for example for use in automobiles, weight, thickness and expense are often limiting factors. With such reductions in automobile size, weight and thickness of parts, higher expectations as to the performance of the interior compartments, and inclusion of more electronic parts and wiring, selecting the most efficient, yet economical, acoustic isolation materials has become even more important. However, reaching certain sound reduction expectations with a sound reducer that is easy to manipulate and durable enough to withstand use in harsh environments remains a challenge. Various woven, knitted and non-woven materials have been considered for such use. Applicant has found that identifying sound reduction materials that are easy to manipulate and durable, as well as beneficial for other factors, for example minimizing abrasion resistance remains challenging.

In the automobile industry, for example, wiring is known to create undesirable excess noise. In efforts to reduce such noise, automobile wiring is traditionally wrapped with sound inhibiting tape. Additionally, wovens and non-wovens have been wrapped around the wiring to reduce noise levels transmitted through the frame and body of the car into the interior car compartment. However, Applicant realizes that there are many challenges associated with these applications for acoustical dampening.

In one example, a nonwoven such as felt has been wrapped around automotive electrical wiring to protect the wiring or reduce the sound resulting from the vibrations occurring in automobiles. Tape is often used to wrap around the felt surrounding the wiring to secure the felt in place. In situations such as these, however, the felt and tape application has a number of disadvantages. By way of example, the felt may display undesirable wearing due to the abrasion and temperatures to which it is exposed. Additionally, the felt does not easily fold around the wiring and/or other automotive parts, and furthermore, securing the felt with the tape is cumbersome, time consuming and labor intensive. Improvements have been attempted to alleviate the need for holding a wrapping, such as the felt, in place on the wiring; however, such improvements like adding fasteners can add unacceptable expense. Also, the external automotive environment can often be extreme with heat and durability being factors in the usefulness and sustainability of materials when applied in such an environment. Often, when a wrapping is used to protect automotive wiring, the wrapping does not offer desirable sound reduction qualities and when wrapping with sound dampening is used, it often is not acceptably abrasion resistant.

DESCRIPTION OF THE INVENTION

The current disclosure is directed, according to a third aspect, to apparatus, systems and methods for an improved textile strip and/or sleeve including a stitched resilient yarn. In many the items here after described, a textile substrate and a resilient yarn will be combined to form a textile strip for protection and sound dampening, a thermo-formed textile strip, and/or an acoustic isolation sleeve. In operation, the inventions can be used to encase contents for protection and to efficiently and durably minimize unwanted sounds in places such as, for example, an automobile passenger compartment. The textile strip and/or sleeve may also be structured to reduce electromagnetic interference, improve abrasion resistance and improve thermal and reflective properties.

Therefore, the present invention concerns an improved textile with sound dampening quality which refers to the following items:

Item 1. A textile strip for sound dampening comprising:
   a sound dampening textile substrate, and
   a resilient yarn stitched to the textile substrate,
wherein the resilient yarn is stitched in a pattern that is repeated longitudinally on the substrate in a weft direction, the pattern including at least one course of an overlapping diagonal traverse of the yarn between the stitches.

Item 2. The textile strip of item 1, wherein when the strip is thermoformed, differential properties of the textile substrate and the resilient yarn maintain a curvature, allowing the textile strip to take the form of a sleeve.

Item 3. The textile strip of item 1 wherein the resilient yarn is a monofilament.

Item 4. The textile strip of item 3 wherein the monofilament is in the range of 0.1 mm to 0.5 mm.

Item 5. The textile strip of item 1 wherein the strip has a first longitudinal free edge and a second longitudinal free edge and the first and second edges each include a selvedge.

Item 6. The textile strip of item 5 wherein the selvedge is a monofilament stitched in a warp direction and the monofilament is within the range of about 0.1 mm to 0.5 mm.

Item 7. The textile strip of item 1 wherein the resilient yarn is a multifilament.

Item 8. The textile strip of item 7 wherein the multifilament is within the range of about 50 dtex to 2,000 dtex.

Item 9. The textile strip of item 5 wherein the selvedge is a multifilament stitched in a warp direction and is within the range of about 50 dtex to 2,000 dtex.

Item 10. The textile strip of item 1 wherein the textile substrate is selected from a non-woven fabric, a knitted fabric and a woven fabric.

Item 11. The textile strip of item 1 wherein the pattern includes at least a second course of an overlapping diagonal traverse of the yarn between the stitches.

Item 12. The textile strip of item 11 wherein the pattern includes a first weft insertion and a second weft bar insertion.

Item 13. A textile strip for sound dampening capable of being formed into a tubular body defining an access opening, the textile strip comprising:
   a flexible textile substrate having a length and a width, and
   a knitted pattern bound to the substrate and formed with a resilient yarn, wherein the pattern includes at least:
     a first two bar weft insertion, and
     a second two bar weft insertion, wherein the first insertion and the second insertion overlap for at least 2 wales in at least 2 courses of the structure.

Item 14. The textile strip of item 13 wherein the overlap of the first insertion and the second insertion do not converge for more than one wale in one course.

Item 15. The textile strip of item 13 wherein the overlap of the first and second insertion forms an angle of between 1 degree and 179 degrees.

Item 16. The textile strip of item 13 including a first longitudinal free edge and a second longitudinal free edge.

Item 17. The textile strip of item 16, wherein the substrate includes a top and a bottom.

Item 18. The textile strip of item 17 wherein thermoforming the textile strip biases the first edge and the second edge of the strip toward each other and shapes the strip into the form of a resilient tubular body.

Item 19. The textile strip of item 17 wherein the pattern is knitted to the substrate on the bottom.

Item 20. The textile strip of item 13 wherein the textile substrate is selected from a non-woven fabric, a knitted fabric and a woven fabric.

Item 21. A thermo-treated textile sleeve comprising:
a textile substrate having a first longitudinal free edge and a second longitudinal free edge,
a resilient yarn applied to the substrate in a lengthwise direction to form a knitted textile strip,
wherein thermo-treating the strip biases the first edge and the second edge of the substrate toward each other creating a curved textile sleeve, and
wherein the resilient yarn maintains a spring bias toward each other of the first edge and the second edge to define an opening within the thermo-treated curved textile sleeve.

Item 22. The sleeve of item 21 wherein the textile substrate is selected from a non-woven fabric, a knitted fabric and a woven fabric.

Item 23. The sleeve of item 22 wherein the yarn is a monofilament having a diameter in the range of about 0.1 mm to 0.5 mm.

Item 24. The sleeve of item 21 wherein the resilient yarn is a multifilament having a denier between about 70d and about 1200d.

Item 25. The sleeve of item 22 wherein the sleeve has an acoustic sound reduction of about 5 decibels or greater.

Item 26. An acoustic isolation sleeve comprising a tubular body defining an access slit and being biased to a closed position, wherein the tubular body is formed from a textile strip comprising:
a flexible textile substrate,
a knitted pattern, bound to the substrate, having a plurality of insertions of a resilient yarn, wherein the pattern includes at least:
a first two bar weft insertion, and
a second two bar weft insertion, wherein the first insertion and the second insertion adjacently overlap for at least 2 wales in at least 2 courses of the structure, thereby creating a reinforced surface on the textile strip that is oriented in the warp direction,
whereby thermoforming the reinforced surface biases a first longitudinal free edge and a second longitudinal free edge of the tubular body toward each other toward the closed position.

Item 27. The sleeve of item 26, wherein the textile substrate has a weight in the range of 50 g/m² to 400 g/m².

Item 28. The sleeve of item 26, wherein the textile substrate has a weight in the range of 10 g/m² to 500 g/m².

Item 29. The sleeve of item 26, wherein the textile strip has an improved sound damp value in the range of 5 dB to 50 dB as determined by an acoustic isolation test.

Item 30. The sleeve of item 26, wherein the sleeve includes at least one of the following additional properties: an electromagnetic interference property having a value in the range of 20 dB to 80 dB as determined by IEC 62153-4-3 Tria-Axial with a frequency range of 150 KHz to 150 MHz; an abrasion resistance property having a value in the range of 1,000 Cycles to 500,000 Cycles as determined by SAE ARP 1536A; and a thermal and a reflective property having a value in the range of 10° C. to 200° C. as determined by SAE J2302 (Parameters distance 25 mm & Temperature 538° C.).

Item 31. The sleeve of item 26 wherein the sleeve includes at least two of the following additional qualities: an electromagnetic interference property having a value in the range of 20 dB to 80 dB as determined by IEC 62153-4-3 Tria-Axial with a frequency range of 150 KHz to 150 MHz; an abrasion resistance property having a value in the range of 1,000 Cycles to 500,000 Cycles as determined by SAE ARP 1536A; and a thermal and a reflective property having a value in the range of 10° C. to 200° C. as determined by SAE J2302 (Parameters distance 25 mm & Temperature 538° C.).

Item 32. The sleeve of item 26, wherein the textile substrate includes at least a portion chosen from at least one of a nonwoven fabric, a knitted fabric, and a woven fabric.

Item 33. The sleeve of item 32, wherein the resilient yarn is a monofilament.

Item 34. The sleeve of item 26, wherein the resilient yarn includes at least one yarn chosen from a polyester yarn having a denier in the range of 70d to 1200d; an aramid yarn having a denier in the range of 70d to 1200d; a polyaramide yarn having a denier in the range of 70d to 1200d; a metallic yarn having a gauge in the range of 36 to 16; a PSS yarn having a denier in the range of 70d to 1200d; and a PEEK yarn having a denier in the range of 70d to 1200d.

Item 35. The sleeve of item 26, wherein the resilient yarn includes at least one monofilament yarn having a diameter in the range of about 0.04 to about 0.5 mm.

Item 36. The sleeve of item 26, wherein the pattern is a repeating pattern for a substantial length of the sleeve lengthwise.

Item 37. The sleeve of item 26, further including a resin component.

Item 38. The sleeve of item 26 wherein the overlap of the first insertion and the second insertion do not converge for more than one wale in one course.

Item 39. The sleeve of item 26 wherein the overlap of the first and second insertion forms an angle of between 1 degree and 179 degrees.

Item 40. The sleeve of item 26 wherein the substrate includes a top and a bottom.

Item 41. The sleeve of item 40 wherein the pattern is knitted to the substrate on the bottom.

Item 42. A method of forming a textile strip comprising the steps of:
placing a sound dampening textile substrate on a warp knitting machine,
knitting a longitudinally repeated pattern onto the substrate using a resilient yarn, the pattern including at least a first stitch and a second stitch creating a substantially diagonal adjacent overlap between the stitches that traverses at least one course and at least one wale,
creating a reinforced surface on the textile strip by applying the resilient yarn pattern to the substrate.

Item 43. A method of forming a textile strip for sound dampening, capable of being formed into a tubular body defining an access opening, comprising the steps of:
selecting a sound dampening flexible textile substrate having a length and a width,
knitting a resilient yarn to the substrate, and
creating a pattern with the resilient yarn, wherein the pattern includes at least:
a first two bar weft insertion,
a second two bar weft insertion,
an adjacent overlap of the first insertion and the second insertion for at least 2 wales in at least 2 courses of the structure.

Item 44. A method of forming a thermo-treated textile sleeve comprising:
- selecting a sound dampening textile substrate having a first longitudinal free edge and a second longitudinal free edge,
- applying a resilient yarn to the substrate in a lengthwise direction to form a knitted textile strip,
- thermo-treating the strip to bias the first edge and the second edge of the substrate toward each other,
- creating a curved textile sleeve with the thermo-treated strip, and
- memory setting a spring bias toward each other of the first edge and the second edge to define an opening within the thermo-treated curved textile sleeve in which contents can be placed inside the sleeve.

Item 45. A method of forming a textile strip for sound dampening, capable of being formed into a tubular body defining an access opening, comprising the steps of:
- creating a tubular body having an access opening and being biased to a closed position,
- forming the tubular body from a flexible knitted textile strip,
- knitting the textile strip with a resilient yarn,
- creating a pattern with the resilient yarn on the textile strip, the pattern including:
  - a first two bar weft insertion, and
  - a second two bar weft insertion, wherein the first insertion, and the second insertion adjacently overlap for at least 2 wales in at least 2 courses of the structure, thereby creating a reinforced surface on the textile strip that is oriented in the warp direction, whereby thermoforming the reinforced surface biases a first longitudinal free edge and a second longitudinal free edge of the tubular body toward each other toward the closed position.

Item 46. A method of sound dampening using a textile strip as described in anyone of items 1 to 13.

Item 47. A method of sound dampening using a thermo-treated textile sleeve as defined in anyone of items 14 to 36.

Accordingly, the current disclosure is directed to apparatus, systems and methods for an improved textile strip and/or sleeve including a stitched resilient yarn. In many examples, a textile substrate and a resilient yarn will be combined to form a textile strip for protection and sound dampening, a thermo-formed textile strip, and/or an acoustic isolation sleeve. In operation, the inventions can be used to encase contents for protection and to efficiently and durably minimize unwanted sounds in places such as, for example, an automobile passenger compartment. The textile strip and/or sleeve may also be structured to reduce electromagnetic interference, improve abrasion resistance and improve thermal and reflective properties.

In one example, the current disclosure is directed to a textile strip for sound dampening including a sound dampening textile substrate and a resilient yarn stitched to the textile substrate. The resilient yarn is stitched in a pattern that is repeated longitudinally on the substrate in a weft direction. The pattern includes at least one course of an overlapping diagonal traverse of the yarn between the stitches.

In another example, a textile strip for sound dampening is capable of being formed into a tubular body defining an access opening. The textile strip includes a flexible textile substrate having a length and a width and a knitted pattern bound to the substrate and formed with a resilient yarn. The pattern includes at least a first two bar weft insertion and a second two bar weft insertion. The first insertion and the second insertion overlap for at least 2 wales in at least 2 courses of the structure.

Also disclosed is a thermo-treated textile sleeve including a textile substrate having a first face and a second face and a resilient yarn applied to the substrate in a lengthwise direction to form a knitted textile strip. Thermo-treating the strip biases the first face and the second face of the substrate toward each other creating a curved textile sleeve. The resilient yarn maintains a spring bias toward each other of the first face and the second face to define an opening within the thermo-treated curved textile sleeve.

In another example, an acoustic isolation sleeve includes a tubular body defining an access slit and being biased to a closed position. The tubular body is formed from a textile strip including a flexible textile substrate and a knitted pattern bound to the substrate. The knitted pattern includes a plurality of insertions of a resilient yarn, and includes at least, a first two bar weft insertion and a second two bar weft insertion. The first insertion and the second insertion adjacently overlap for at least 2 wales in at least 2 courses of the structure, creating a reinforced surface on the textile strip that is oriented in the warp direction. Thermoforming the reinforced surface biases a first face and a second face of the tubular body toward each other toward the closed position.

The disclosure is also directed to a method of forming a textile strip including the steps of: placing a sound dampening textile substrate on a warp knitting machine, knitting a longitudinally repeated pattern onto the substrate using a resilient yarn, the pattern including at least a first stitch and a second stitch creating a substantially diagonal adjacent overlap between the stitches that traverses at least one course and at least one wale, and creating a reinforced surface on the textile strip by applying the resilient yarn pattern to the substrate.

Disclosed also is a method of forming a textile strip for sound dampening, capable of being formed into a tubular body defining an access opening, including the steps of: selecting a sound dampening flexible textile substrate having a length and a width, knitting a resilient yarn to the substrate and creating a pattern with the resilient yarn. The pattern includes at least a first two bar weft insertion, a second two bar weft insertion and an adjacent overlap of the first insertion and the second insertion for at least 2 wales in at least 2 courses of the structure.

In another example, a method of forming a thermo-treated textile sleeve includes: selecting a sound dampening textile substrate having a first face and a second face, applying a resilient yarn to the substrate in a lengthwise direction to form a knitted textile strip, thermo-treating the strip to bias the first face and the second face of the substrate toward each other, creating a curved textile sleeve with the thermo-treated strip, and memory setting a spring bias toward each other of the first face and the second face to define an opening within the thermotreated curved textile sleeve in which contents can be placed inside the sleeve.

Other examples include a method of forming a textile strip for sound dampening, capable of being formed into a tubular body defining an access opening, including the steps of: creating a tubular body having an access opening and being biased to a closed position, forming the tubular body from a flexible knitted textile strip, knitting the textile strip with a resilient yarn, and creating a pattern with the resilient yarn on the textile strip. The pattern includes a first two bar weft insertion and a second two bar weft insertion. The first insertion and the second insertion adjacently overlap for at least 2 wales in at least 2 courses of the structure, creating a reinforced surface on the textile strip that is oriented in the warp direction. Thermoforming the reinforced surface biases a first face and a second face of the tubular body toward each other toward the closed position.

A method of sound dampening using a textile strip as described in items 1-14 is also disclosed. Additionally, a method of sound dampening is disclosed using a thermo-treated textile sleeve as described in items 15-37. Generally, the disclosure is also directed to a method of sound dampening using a textile strip and/or sleeve as described herein.

The above summary was intended to summarize certain embodiments of the disclosure. Systems and methods will be set forth in more detail, along with examples demonstrating efficacy, in the figures and detailed description below. It will be apparent, however, that the detailed description is not intended to limit the present disclosure.

BRIEF DESCRIPTION OF THE EXAMPLES

Figure 6:
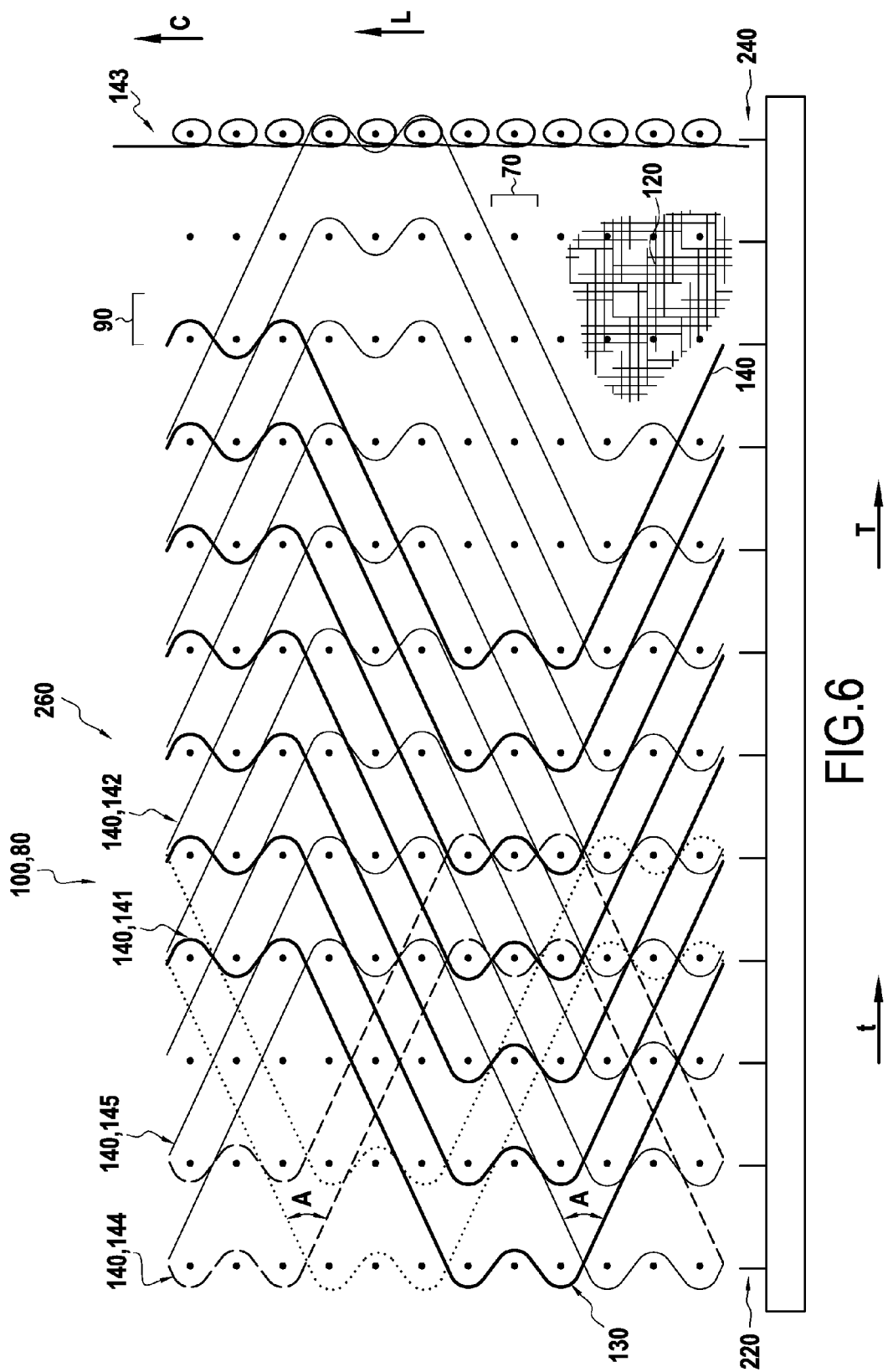
FIG. 6 represents an example of a knitting pattern of the warp knitted textile according to the invention in strip form.

FIG. 6 represents an example of a knitting pattern of the warp knitted textile according to the invention in strip form.

Figure 7A:
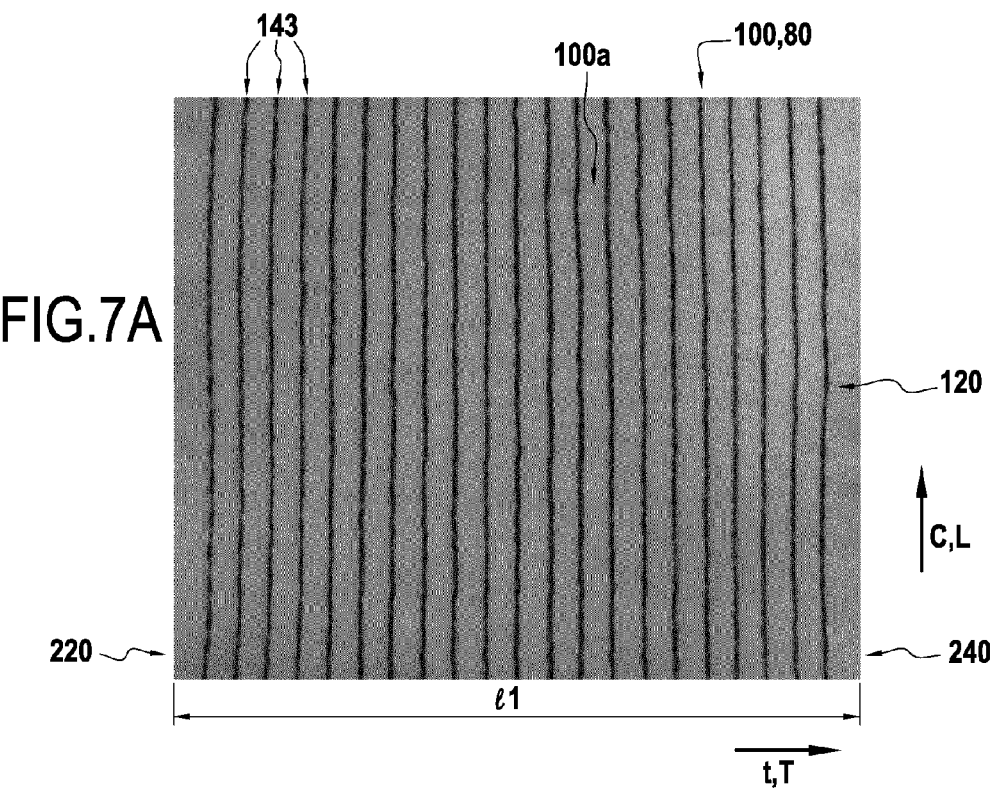
FIG. 7A is top view of the external face of the warp knitted textile knitted according to the knitting pattern represented in FIG. 6, said warp knitted textile being knitted on a sound dampening textile substrate.

FIG. 7A is top view of the external face of the warp knitted textile knitted according to the knitting pattern represented in FIG. 6, said warp knitted textile being knitted on a sound dampening textile substrate.

Figure 7B:
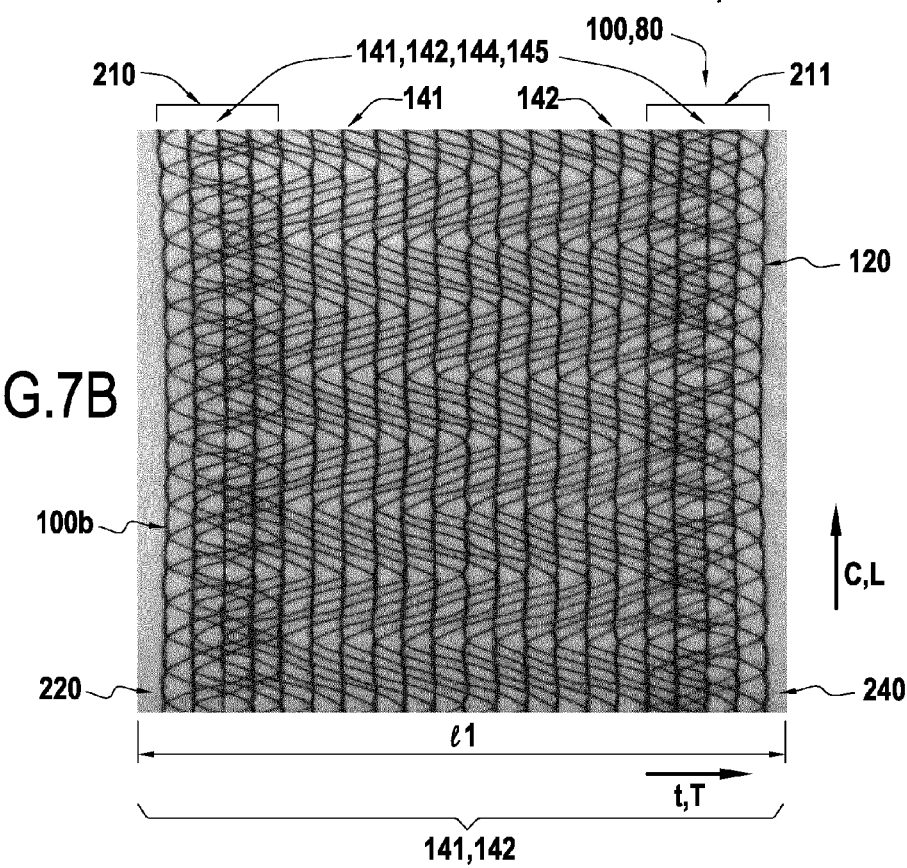
FIG. 7B is a top view of the internal face of the warp knitted textile knitted according to the knitting pattern represented in FIG. 6, said warp knitted textile is knitted on a sound dampening textile substrate.

FIG. 7B is a top view of the internal face of the warp knitted textile knitted according to the knitting pattern represented in FIG. 6, said warp knitted textile is knitted on a sound dampening textile substrate.

Figure 8:
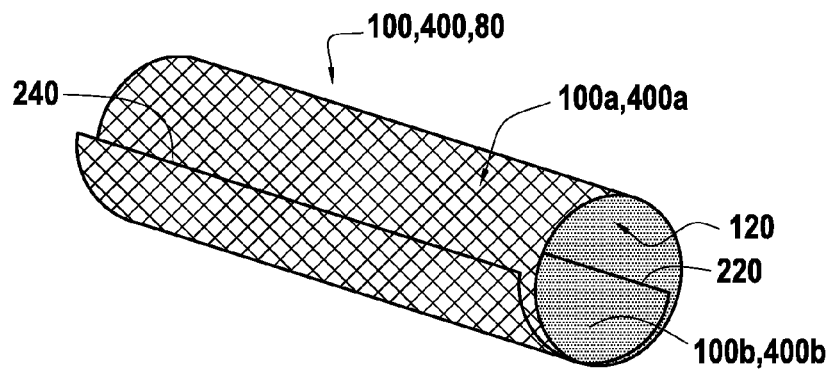
FIG. 8 is as schematic perspective view of a self-closing sleeve having its first and second longitudinal opposite free edges biased toward each other and comprising the warp knitted textile and the sound dampening textile substrate represented in FIGS. 7A and 7B.

FIG. 8 is as schematic perspective view of a self-closing sleeve having its first and second longitudinal opposite free edges biased toward each other and comprising the warp knitted textile and the sound dampening textile substrate represented in FIGS. 7A and 7B.

Figure 9:
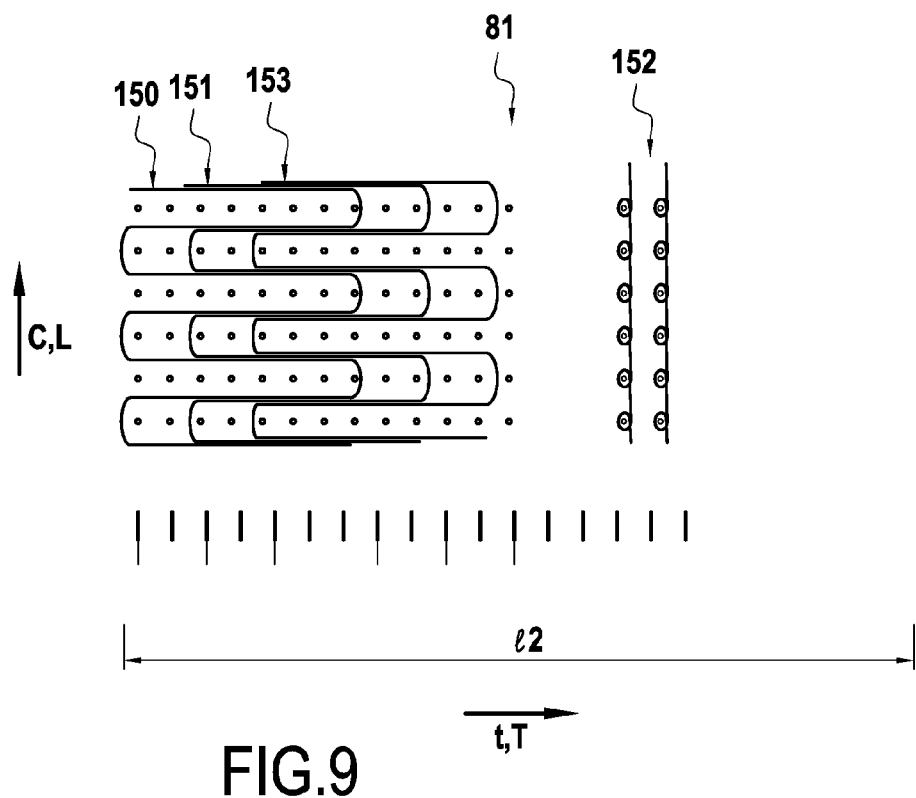
FIG. 9 represents another example of a knitting pattern of the warp knitted textile according to the invention.

FIG. 9 represents another example of a knitting pattern of the warp knitted textile according to the invention.

Figure 10:
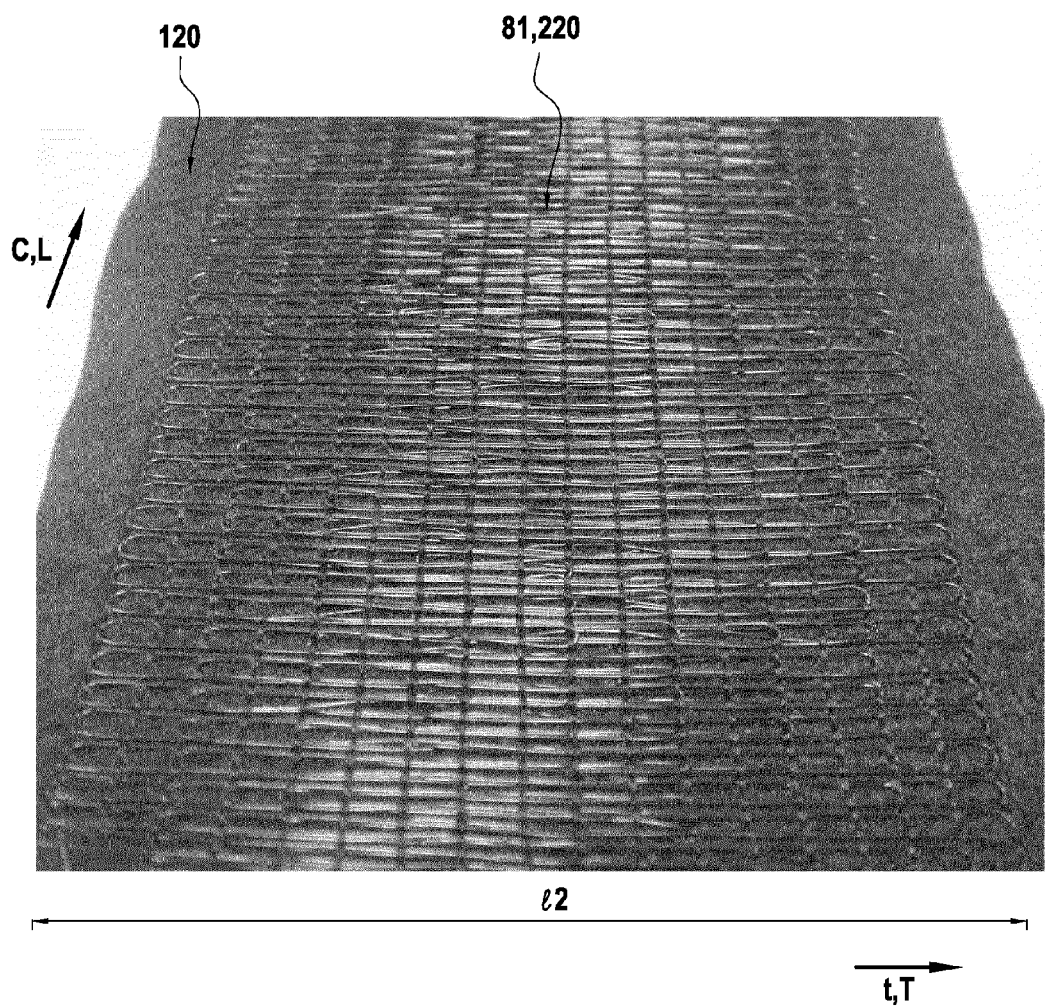
FIG. 10 is a top view of the internal face of the warp knitted textile knitted according to the knitting pattern represented in FIG. 9, said warp knitted textile being knitted on a sound dampening textile substrate.

FIG. 10 is a top view of the internal face of the warp knitted textile knitted according to the knitting pattern represented in FIG. 9, said warp knitted textile being knitted on a sound dampening textile substrate.

DETAILED DESCRIPTION OF EXEMPLARY EMBODIMENTS

Referring now to the items in general, and FIGS. 6, 7A, 7B and 8 specifically, one example of a sound dampening textile strip, generally designated 100, and a sound dampening sleeve, generally designated 400, are shown. Systems, apparatuses and methods may vary from example to example but they may often include a sound dampening textile substrate and a monofilament yarn stitched to the textile substrate forming a textile strip, and additionally, thermo-treated to form a self-closing sleeve.

Applicants discovered in a series of research and development testing, that stitch bonding a resilient monofilament yarn pattern in the textile substrate could not only increase the abrasion resistance of a textile strip, but could also increase the acoustical dampening capacity of the strip. However, in achieving such results, it was difficult to maintain other desirable characteristics, such as a consistently smooth yarn pattern after thermoforming the strip into a sleeve.

Various textile strips were exposed to heat to shrink the knitted substrate through a thermoform process in order to further shape the knitted substrate into a desired geometry. Applicant discovered that the addition of the yarn to the substrate provided a desired rigidity and strength to the substrate for durability, and through research and testing was able to eventually reach improved acoustic and abrasion resistance results as well.

Applicant realized that there was not an existing recipe for successfully combining an acoustical substrate with a resilient monofilament yarn to produce a sound dampening textile that had adequate durability and practicality. Originally, Applicant began with a substrate cut to a predetermined width with a moderate thickness and nominal amount of bicomponent fibers.

Several variables were recognized that could affect the knitted substrate, such as, the amount of shrinkage to occur as the substrate was to be fed under tension into a knitting machine, stitch formation and the amount of shrinkage to occur during thermoforming.

In order to account for these variables and to develop a textile strip for sound dampening, a nonwoven substrate with desired acoustical properties was knitted in a continuous lengthways direction with a monofilament yarn applied in the weft direction with multiple weft insertion patterns. Of concern was that the nonwoven was able to maintain an acceptable range of testing results, including, tubular shape, rigidity, strength and memory, after the knitted nonwoven was exposed to the thermoforming process. A series of research and development testing occurred in order to achieve a resilient monofilament yarn knitted textile strip demonstrating acceptable results upon thermo-treatment.

In one example, to prepare the knitting machine for applying a monofilament to a nonwoven, the knitting needles were placed in the knitting machine to allow a centered and even spacing across the width of the tensioned non-woven. Space was allowed for a small selvedge on each edge to allow for a soft edge of the finished product. A one weft bar movement over eight needles in a traverse direction was used for the monofilament weft movement. Applicants used multiple thread guides for the monofilament placed on the same weft insertion bar across the width of the non-woven to allow for an overlapping of the monofilament, as seen in FIG. 4. The added selvedge included multifilament warp yarns added in a simple closed loop form. Subsequently, the knitted non-woven was thermoformed into a closed tubular sleeve including a longitudinal access slit.

From this sample, Applicants discovered that the monofilament and the non-woven could have very different shrinkage values from the heat from the thermoforming process and that shrinkage may be incompatible between the substrate and the yarn, for example, as tested here, the non-woven and the monofilament. The non-woven was discovered to act as insulation to the monofilament during the process. As a result, the monofilament was able to slip inside the stitch formation making unwanted excess loops in the inside of the tubular formed shell. Such looping could interfere with the ability of the tubular shell to surround its intended contents adequately to protect the contents and to retain the sound dampening abilities.

This thermoformed textile strip not only experienced monofilament looping issues after thermoforming due to inconsistencies between monofilament and nonwoven shrinkage but also failed to fit within acceptable tolerance ranges for heat aging and abrasion resistance testing on the sleeve. Applicants realized that the nonwoven and resilient yarn characteristics, as well as the pattern in which the resilient yarn is applied to the substrate, combine in the knitted non-woven thermoformed sleeve in unexpected ways to give the thermoformed sleeve its own unique set of characteristics and affected whether the thermoformed strip achieves acceptable heat ageing, acoustic dampening and abrasion resistance levels.

The nonwoven weight was adjusted to address the lack of abrasion resistance. The pattern of the monofilament was adjusted to reduce the shrinkage, slippage and looping issues. A selvedge was further developed and tested to maintain a soft edge on the sleeve but that still had enough durability. The weight of the nonwoven was lowered and the textile substrate was cut smaller to accommodate for more suitable stretch and tension of the nonwoven to allow better punch through of needles.

Experimentation and Testing

Heat Aging/Shape Retention Testing: tubular shape retention of the sleeve was evaluated by heat aging testing where a thermoformed textile strip was exposed to temperatures of around 150° C. to 175° C. for around 240 hours mimicking temperatures experienced in automobiles around the motor area. Additional evaluation was made at around 125° C. to 150° C. for around 3,000 hours mimicking temperatures reached in the passenger compartment and non-motor areas of a vehicle.

Abrasion Resistance Testing: Abrasion Resistance was evaluated by SAE ARP 1536 A methods.

Acoustic Insulation Testing: acoustic Insulation characteristics were evaluated by measuring the absorbing/silencing effect that textile samples demonstrate in eliminating rattling and vibration noises. The test was designed to produce qualitative data for the silencing effect and is appropriate, for example, in instances such as on materials used for vehicle sound reduction.

Generally, a steel bar was dropped onto an aluminum plate (thickness 0.3 mm) from a height of 20 mm, exerting a force of 1.16 N. The noise is measured by a microphone positioned 50 mm over the impact location. The noise is measured in the form of the sound pressure level (Lsp) with frequency evaluation A and time evaluation S. A single layer of the acoustic insulation material was applied to the steel bar in the area of the impact location over a length of around 5 cm in a longitudinal direction. The measure is the difference between the noise of the bar wrapped with the self-closing sleeve and the unwrapped bar. The measuring unit is (dB). The measurement was performed a minimum of ten times at the same location of the specimen. If a trend towards lower silencing values can be discerned, for example, by compressing the specimen, it is noted in the results report. The testing was conducted in a low noise environment.

Returning to FIG. 6, the sound dampening textile substrate 120 may be a non-woven fabric, a knitted fabric and/or a woven fabric. The substrate typically is cut to a predetermined width (l1) with a moderate thickness and may include a nominal amount of bicomponent fibers. The substrate may include a top face and a bottom face and a first and a second longitudinal opposite free edges.

In one example, a non-woven substrate may have a basis weight of about 60 g/m² to about 400 g/m². Typically, a non-woven is a textile made from fibers bonded together randomly by chemical, mechanical, heat and/or solvent treatment. A binder may or may not be included. The non-woven may, for example, be a plastics material, such as formed from a polyester and/or a polyethylene terephthalate (PET). Alternatively, the non-woven may be formed of fiberglass or aramid fibers.

The first resilient yarn 140 may be, for example, a monofilament and/or a multifilament. In one example, a monofilament may have a diameter in the range of about 0.1 mm to 0.5 mm. The monofilament may be a plastic material, such as from polyester or alternatively may be formed of PET, PPS and/or from PEEK. The multifilament may, for example, have a denier in the range of about 70d to about 1200d. The multifilament may be formed of a plastics material, such as from polyester, PET yarns, PPS yarns, PEEK yarns, metallic yarns, aramid and/or polyaramid yarns. Typically, the resilient yarn is knitted to substrate through a crochet-type machine, for example a weft knitting machine.

It should be noted that the knitting pattern represented in FIG. 6 corresponds to the knitting pattern representing in FIG. 1 concerning the invention here above described according to a first aspect. The warp knitted textile 1 described in reference to FIG. 1 is the same that the warp knitted textile 80 represented in FIGS. 6, 7A, 7B and 8.

The first 4, second 5, third 12, fourth 13 and fifth 15 yarns represented in FIGS. 1, 2A and 2B correspond respectively to the first 141, second 142, third 143, fourth 144 and fifth 145 yarns represented in FIGS. 6, 7A and 7B.

The assemblies resulting from the combination of a sound dampening textile substrate 120 and a warp knitted textile 80, namely sound dampening textile strips 100, have been tested through the samples 3 and 4 here after described.

FIG. 9 represent another example of a knitting pattern according to the invention wherein the warp knitted textile 81 comprises a first 150, a second 151, a third 152 and a fourth 153 yarns that are respectively the same than the first 4, the second 5, the third 12, and the fourth 13 yarns represented in FIGS. 1, 2A and 2B. The warp knitted textile 81 represented in FIGS. 9 and 10 is different from the warp knitted textile 1 only in that the first 150, second 151 and fourth 153 yarns form laying-in stitches that extend respectively on eight wales or needles on all the width (l2) of the warp knitted textile 81, said laying-in stitches being shifted each two wales. Moreover, the first 150, second 151 and fourth 153 yarns overlap only one course between two neighboring wales when they extend on eight wales. Therefore, the first 150, second 151 and fourth 153 yarns do not extend diagonally in the weft direction but extend in parallel to the transverse axis (t). The resulting sound dampening textile strip 220 have been tested through the samples 1 and 2.

Sample 1

The sound dampening textile strip 220 comprises a sound dampening substrate 120 which is a nonwoven of 150 g/m², and a warp knitted textile 81 with the first 150, second 151, and fourth 153 yarns disposed on the internal face of the corresponding thermoformed self-closing sleeve, the third yarn 152 being disposed on the external face of said sleeve.

Acoustic Insulation Testing Results: 21.3 dB

Abrasion Resistance Testing Results: Average 37 456 cycles

Sample 2

The sound dampening textile strip 220 comprises a sound dampening substrate 120 which is a nonwoven of 150 g/m², and a warp knitted textile 81 with the first 150, second 151, and fourth 153 yarns disposed on the external face of the corresponding thermoformed self-closing sleeve, the third yarn 152 being disposed on the internal face of said sleeve.

Acoustic Insulation Testing Results: 16.7 dB

Abrasion Resistance Testing Results: Average 357 191 cycles

Sample 3

The sound dampening textile strip 100 comprises a sound dampening substrate 120 which is a nonwoven of 150 g/m², and a warp knitted textile with the first 141, second 142, fourth 144 and fifth 145 yarns disposed on the internal face 400b of the thermoformed self-closing sleeve 400, the third yarn 143 being disposed on the external face 400a of said sleeve 400.

Acoustic Insulation Testing Results: 19.6 dB

Abrasion Resistance Testing Results: Average 22 235 cycles

Sample 4

The sound dampening textile strip 100 comprises a sound dampening substrate 120 which is a nonwoven of 150 g/m², and a warp knitted textile with the first 141, second 142, fourth 144 and fifth 145 yarns disposed on the external face 400a of the thermoformed self-closing sleeve 400, the third yarn 143 being disposed on the internal face 400b of said sleeve 400.

Acoustic Insulation Testing Results: 15.8 dB

Abrasion Resistance Testing Results: Average 129 232 cycles

Sample 5

The sound dampening textile strip 100 comprises a sound dampening substrate 120 which is a nonwoven of 300 g/m², and a warp knitted textile with the first 141, second 142, fourth 144 and fifth 145 yarns disposed on the internal face 400b of the thermoformed self-closing sleeve 400, the third yarn 143 is disposed on the external face 400a of said sleeve 400.

Acoustic Insulation Testing Results: 22.2 dB

Abrasion Resistance Testing Results: Average 498 238 cycles

Acoustic Insulation Testing has yielded results of about 10 dB on some samples. In some examples, an acoustic sound reduction of about 5 decibels or greater has been achieved in the sleeve including a textile substrate knitted with a resilient yarn.

It was found that increasing the weight of a nonwoven used in the strip and tested in a sleeve, did not correspondingly/incrementally increase the acoustic insulation results obtained from strip/sleeve testing accordingly and as would be expected. Acoustic sampling has shown significant acoustic dampening when the textile strip is thermoformed with the textile substrate on the outside of the sleeve. Abrasion sampling has shown significant abrasion resistance when the textile strip is thermoformed with the resilient yarn on the outside of the sleeve. Applicant's strip may be reversibly thermoformed depending on the predominantly desired characteristic, acoustic dampening or abrasion resistance, while still maintaining acceptable performance ratios as to the other characteristic.

FIGS. 6, 7A and 7B show one example of a textile strip 80 for sound dampening strip 100 including, a sound dampening textile substrate 120 and a resilient yarn 140, stitched to the textile substrate 120. The resilient yarn 140 is stitched in a pattern 260 that is repeated longitudinally (L) on the substrate 120 in a weft direction (T), the pattern 260 including at least one course 70 of an overlapping diagonal traverse 130 of the yarn 140 between the stitches 160c and 160d. The strip 100 may additionally include at least a second course of an overlapping diagonal traverse of the yarn between the stitches. The textile strip 100 may be thermoformed and the differential properties of the textile substrate and the resilient yarn may maintain a curvature in the strip, allowing the textile strip to take the form of a sleeve 400. The sound dampening textile strip 100 may include a first longitudinal free edge 220 and a second longitudinal free edge 240 and the first 220 and second 240 edges each may include a selvedge 210,211. The selvedges 210,211 may comprises a monofilament, like the fourth yarn 144 and the fifth yarn 145, stitched in a warp direction (L) and the monofilament within the range of about 0.1 mm to 0.5 mm. The selvedge may be a multifilament stitched in a warp direction and within the range of about 50 dtex to 2,000 dtex.

In another example, a textile strip for sound dampening capable of being formed into a tubular body defining an access opening may include, a flexible textile substrate having a length and a width, and a knitted pattern bound to the substrate and formed with a resilient yarn. The pattern includes at least, a first weft insertion that corresponds for example to the first yarn 4 and a second weft insertion that corresponds for example to the second yarn 5. The first and second insertions may be two-bar weft insertions. The first insertion and the second insertion overlap for at least 2 wales in at least 2 courses of the structure. In one example, the first insertion and the second insertion do not converge for more than one wale 90 in one course 70. In another example, overlap of the first and second insertion forms an angle A of between 1 degree and 179 degrees. The textile strip 100 may include a first longitudinal free edge 220, a second longitudinal free edge 240 and an external face 100a and an internal face 100b. The pattern 260 may be knitted to the internal face 100b or alternatively to the external face 100a of the strip 100. The internal face 100b of the strip 100 corresponds to the internal face 400b of the self-closing sleeve 400 as represented in FIG. 8. The external face 100a of the strip 100 corresponds to the external face 400a of the self-closing sleeve 400. Thermoforming the textile strip 100 may bias the first longitudinal free edge 220 and the second longitudinal free edge 240 of the strip 100 toward each other, shaping the strip 100 into the form of a resilient tubular body 400. If the pattern is knitted to the external face 100a of the strip 100, the pattern may end up on the internal face 400b of the tubular sleeve 400 when thermoforming the strip 100 into the sleeve 400. If the pattern is knitted on the internal face 100b of the strip 100, the pattern may end up on the external face 400a of the tubular sleeve 400 when the strip 100 is thermoformed into the sleeve.

Thermoforming uses heat to set a material to a desired geometry, typically by modifying the properties of the material. Generally, thermoforming raises the heat to temperatures at a point either above a material transition point or to a softening point. When the material is cooled, the material retains an elastic memory of the formed shape. While thermoforming is widely recognized by those of skill in the art as a way to set an elastic memory in a material, chemical and/or physical methods may also be used.

The disclosure is also considered a thermo-treated textile sleeve 400 including, a textile substrate 120 having a first longitudinal free edge 220 and a second longitudinal free edge 240 and a resilient yarn 140 applied to the substrate in a lengthwise direction (L) to form a knitted textile strip 100. Thermo-treating the strip 100 biases the first edge 220 and the second edge 240 of the substrate 120 toward each other creating a curved textile sleeve 400. The resilient yarn 140 maintains a spring bias toward each other of the first edge 220 and the second edge 240 to define an opening within the thermo-treated curved textile sleeve 400.

In another example, an acoustic isolation sleeve 400 includes a tubular body defining an access slit and being biased to a closed position. The tubular body is formed from a textile strip 100 including, a flexible textile substrate 120 and a knitted pattern 260, bound to the substrate 120. The knitted pattern has a plurality of insertions of a resilient yarn 140 and the pattern includes at least: a first two bar weft insertion and a second two bar weft insertion. The first insertion and the second insertion adjacently overlap for at least 2 wales 90 in at least 2 courses 70 of the structure, thereby creating a reinforced surface on the textile strip that is oriented in the warp direction. Thermoforming the reinforced surface biases the first face and the second face of the tubular body toward each other and toward the closed position. In one example, the pattern may be a repeating pattern for a substantial length of the sleeve lengthwise. In another example, the overlap of the first insertion and the second insertion do not converge for more than one wale 90 in one course 70. The disclosure also includes an example where the overlap of the first insertion and second insertion forms an angle A of between 1 degree and 179 degrees. The sleeve may additionally include a resin component.

An improved acoustic sleeve may include at least one of the following additional properties: an electromagnetic interference property having a value in the range of 20 dB to 80 dB as determined by IEC 62153-4-3 Tria-Axial with a frequency range of 150 KHz to 150 MHz; an abrasion resistance property having a value in the range of 1,000 Cycles to 500,000 Cycles as determined by SAE ARP 1536A; and a thermal and a reflective property having a value in the range of 10° C. to 200° C. as determined by SAE J2302 (Parameters distance 25 mm & Temperature 538° C.).

The sleeve may also contain more than one of the qualities above.

The disclosure is also directed to a method of forming a textile strip including the steps of: placing a sound dampening textile substrate on a warp knitting machine, knitting a longitudinally repeated pattern onto the substrate using a resilient yarn, the pattern including at least a first stitch and a second stitch creating a substantially diagonal adjacent overlap between the stitches that traverses at least one course and at least one wale, and creating a reinforced surface on the textile strip by applying the resilient yarn pattern to the substrate.

Disclosed also is a method of forming a textile strip for sound dampening, capable of being formed into a tubular body defining an access opening, including the steps of: selecting a sound dampening flexible textile substrate having a length and a width, knitting a resilient yarn to the substrate and creating a pattern with the resilient yarn. The pattern includes at least a first two bar weft insertion, a second two bar weft insertion and an adjacent overlap of the first insertion and the second insertion for at least 2 wales in at least 2 courses of the structure.

In another example, a method of forming a thermo-treated textile sleeve includes: selecting a sound dampening textile substrate having a first face and a second face, applying a resilient yarn to the substrate in a lengthwise direction to form a knitted textile strip, thermotreating the strip to bias the first face and the second face of the substrate toward each other, creating a curved textile sleeve with the thermo-treated strip, and memory setting a spring bias toward each other of the first face and the second face to define an opening within the thermotreated curved textile sleeve in which contents can be placed inside the sleeve.

Other examples include a method of forming a textile strip for sound dampening, capable of being formed into a tubular body defining an access opening, including the steps of: creating a tubular body having an access opening and being biased to a closed position, forming the tubular body from a flexible knitted textile strip, knitting the textile strip with a resilient yarn, and creating a pattern with the resilient yarn on the textile strip. The pattern includes a first two bar weft insertion and a second two bar weft insertion. The first insertion and the second insertion adjacently overlap for at least 2 wales in at least 2 courses of the structure, creating a reinforced surface on the textile strip that is oriented in the warp direction. Thermoforming the reinforced surface biases a first face and a second face of the tubular body toward each other toward the closed position.

A method of sound dampening using a textile strip as described in items 1-14 is also disclosed. Additionally, a method of sound dampening is disclosed using a thermo-treated textile sleeve as described in items 15-37. Generally, the disclosure is also directed to a method of sound dampening using a textile strip and/or sleeve as described herein.

Numerous characteristics and advantages have been set forth in the foregoing description, together with details of structure and function. The disclosure, however, is illustrative only, and changes may be made in detail, especially in matters of shape, size and arrangement of parts, within the principle of the invention, to the full extent indicated by the broad general meaning of the terms in which the general claims are expressed. It is further noted that, as used in this specification, the singular forms "a," "an," and "the" include plural referents unless expressly and unequivocally limited to one referent. The use of the term "diagonal" is directional and non-diagonal overlaps are considered within the scope of this invention.

The invention claimed is:

1. An elongate self-closing sleeve for protecting at least one elongated member, said sleeve comprising internal and external opposite faces, said sleeve comprises a warp knitted textile having first and second longitudinal opposite free edges biased toward each other in order to define an internal space configured to receive said at least one elongate member, wherein said sleeve has a transverse axis (t) corresponding to the weft direction (T) of the warp knitted textile and a longitudinal axis (L) corresponding to the warp direction (C) of the warp-knitted textile, wherein said warp knitted textile comprises a first monofilament yarn that is lapped by a first guide bar and a second monofilament yarn that is lapped by a second guide bar which is different from the first guide bar, each of said first and second monofilament yarns forming laying-in stitches and extending in the same direction between said free edges on at least two wales, and a third yarn forming chain stitches or tricot stitches, said first and second yarns comprising at least one plastic material, and wherein the first yarn, and the second yarn extend diagonally between two neighbouring wales in a direction (M) that forms an angle alpha with the transverse axis (t).

2. The elongate self-closing sleeve according to claim 1, wherein the first yarn and the second yarn are also knitted on at least three courses on a same wale and are alternated with each other on said same wale.

3. The elongate self-closing sleeve according to claim 1, wherein the first yarn, and optionally the second yarn, overlap(s) at least two courses in the weft direction between two neighbouring wales when said first, and optionally second, yarn(s) extend(s) on at least two wales.

4. The elongate self-closing sleeve according to claim 1, wherein the warp knitted textile comprises at least a fourth monofilament yarn, and optionally a fifth monofilament yarn, that form(s) laying-in stitches that are in opposition to the laying-in stitches formed by each of the first yarn and the second yarn.

5. The elongate self-closing sleeve according to claim 4, wherein the fourth monofilament yarn, and optionally the fifth monofilament yarn, form(s) laying-in stitches in a first zone and in a second zone, the first zone is in proximity to said first longitudinal free edge and the second zone is in proximity to said second longitudinal free edge.

6. The elongate self-closing sleeve according to claim 4, wherein the fourth yarn, and optionally the fifth yarn, is/are also knitted on at least three courses on a same wale.

7. The elongate self-closing sleeve according to claim 6, wherein the fourth yarn and the fifth yarn are alternated with each other on a same wale.

8. The elongate self-closing sleeve according to claim 1, wherein the warp knitted textile comprises at least one covering yarn forming laying-in stitche(s) extending between said first and second longitudinal opposite free edges on the external face or the internal face of said sleeve.

9. The elongate self-closing sleeve according to claim 8, wherein the at least one covering yarn is chosen among: a multifilament yarn comprising at least one plastic material, an electrically conductive yarn or a multifilament yarn in glass or silica.

10. The elongate self-closing sleeve according to claim 1, wherein said sleeve comprises a covering yarn forming one laying-in stitch extending between said first and second longitudinal opposite free edges.

11. The elongate self-closing sleeve according to claim 1, wherein the third yarn is a multifilament yarn, having a fineness which is comprised between 70 deniers and 1200 deniers.

12. The elongate self-closing sleeve according to claim 1, wherein the first and/or the second and/or the fourth and/or the fifth monofilament(s) yarn(s) has/have a diameter that is comprised between 0.10 mm and 0.50 mm.

13. The elongate self-closing sleeve according to claim 1, wherein the sleeve comprises an electromagnetic and/or reflective foil or coating on its external face.

14. The elongate self-closing sleeve according to claim 1, wherein the sleeve comprises at least one thermofusible polymer disposed in a regular pattern on the internal face and/or the external face of said sleeve.

\* \* \* \* \*